Figure 4:
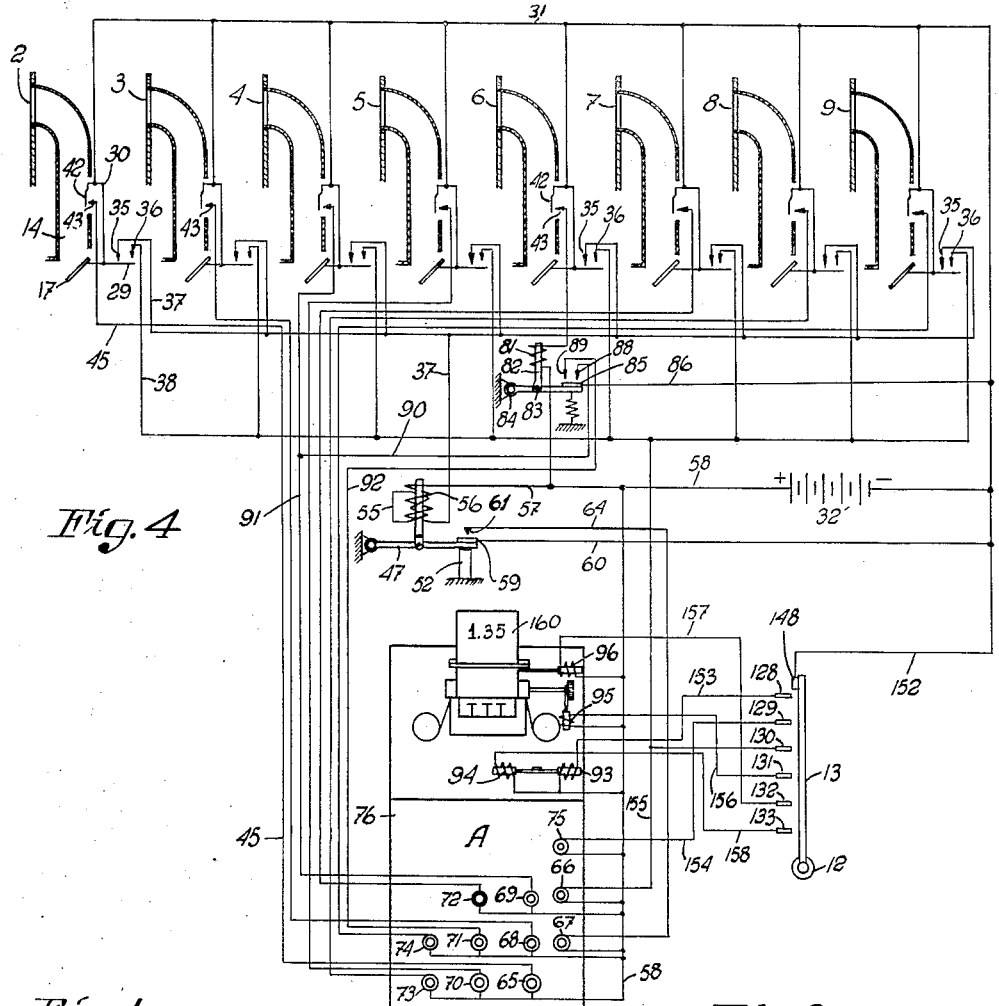

COIN REGISTERING AND CALCULATING APPARATUS

Filed Feb. 17, 1932   20 Sheets—Sheet 1

Filed Feb. 17, 1932    20 Sheets-Sheet 2

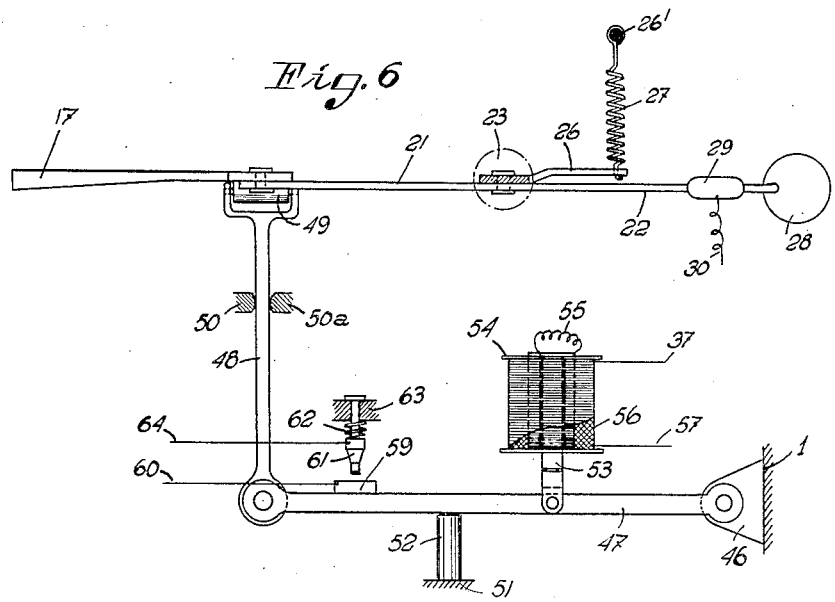
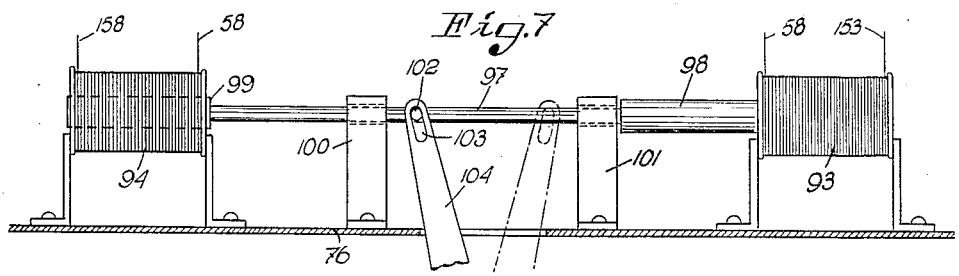
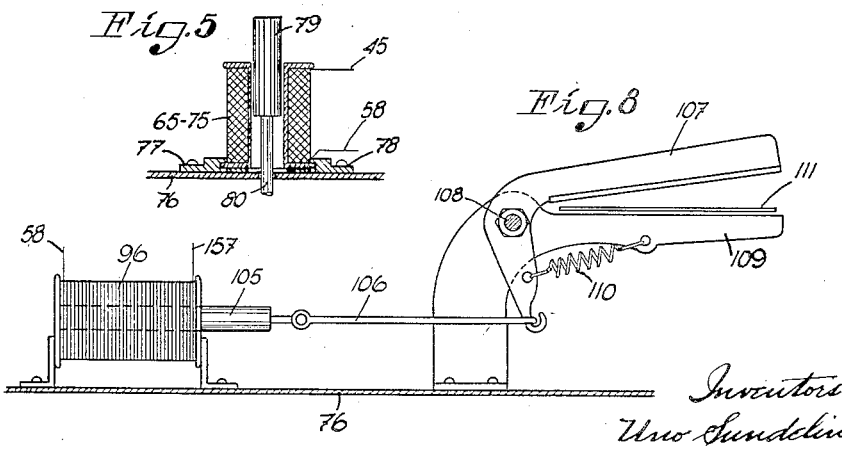

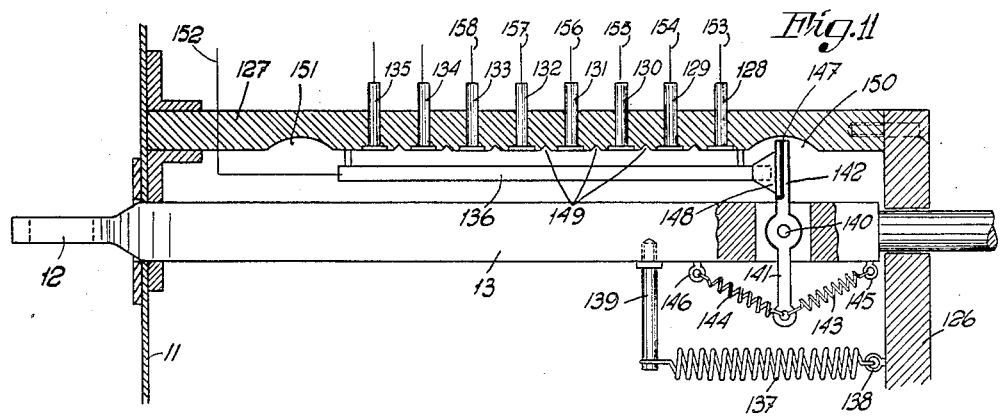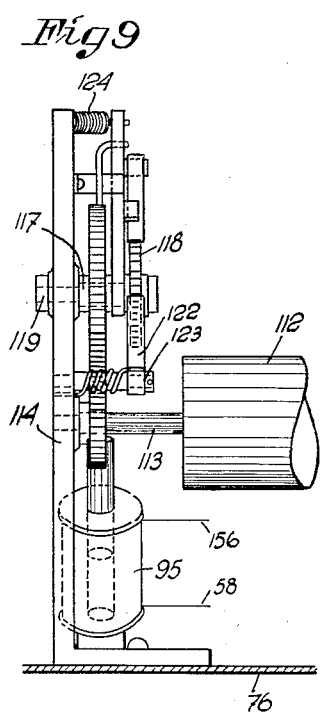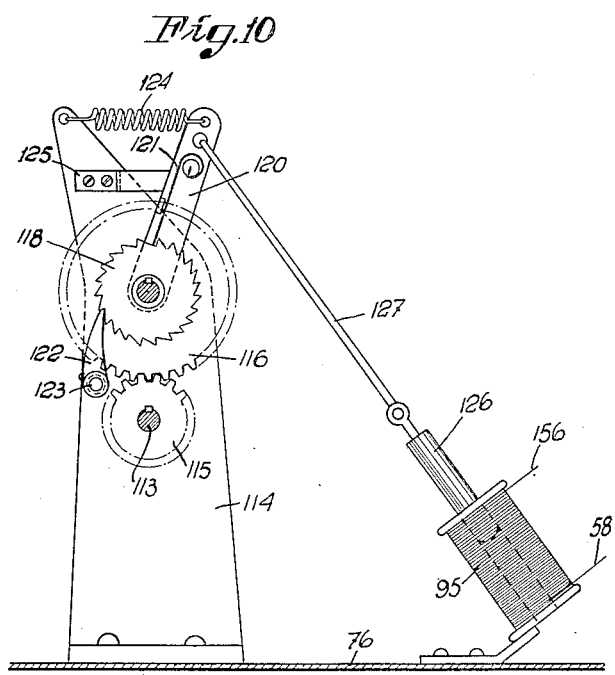

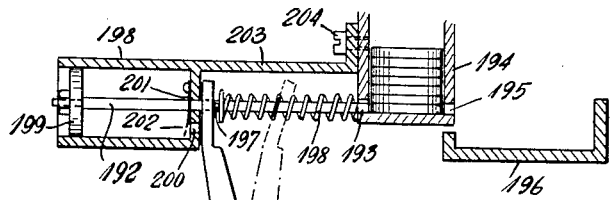
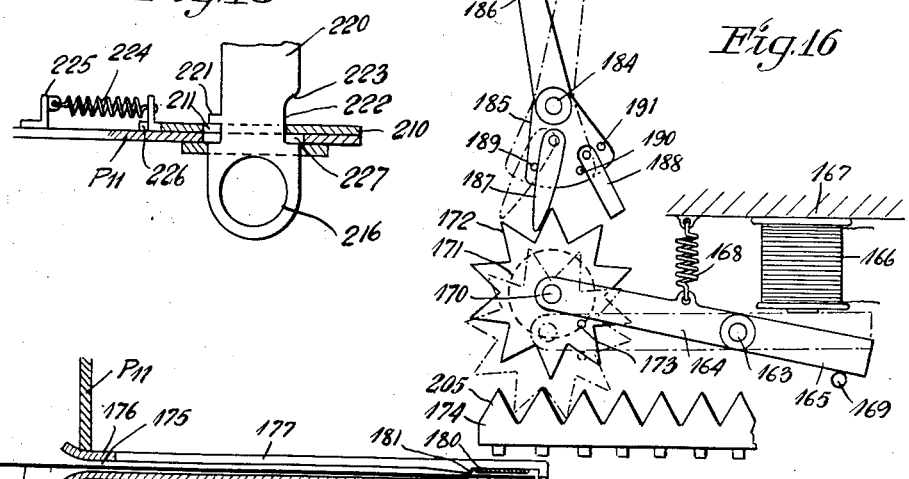
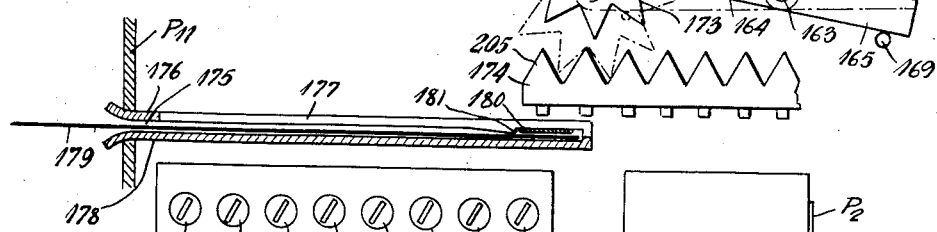
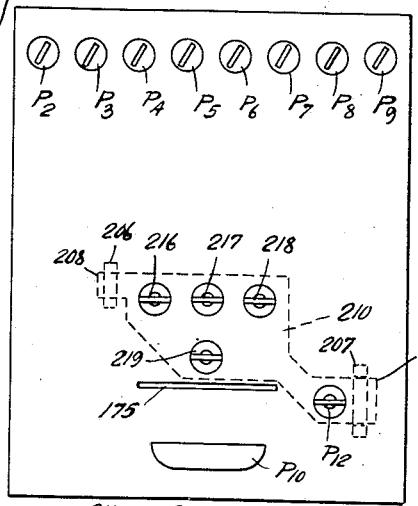
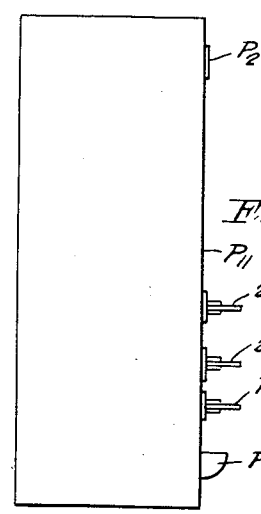
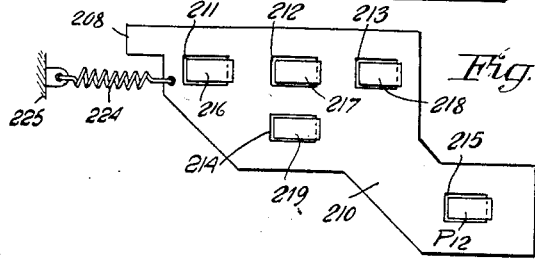

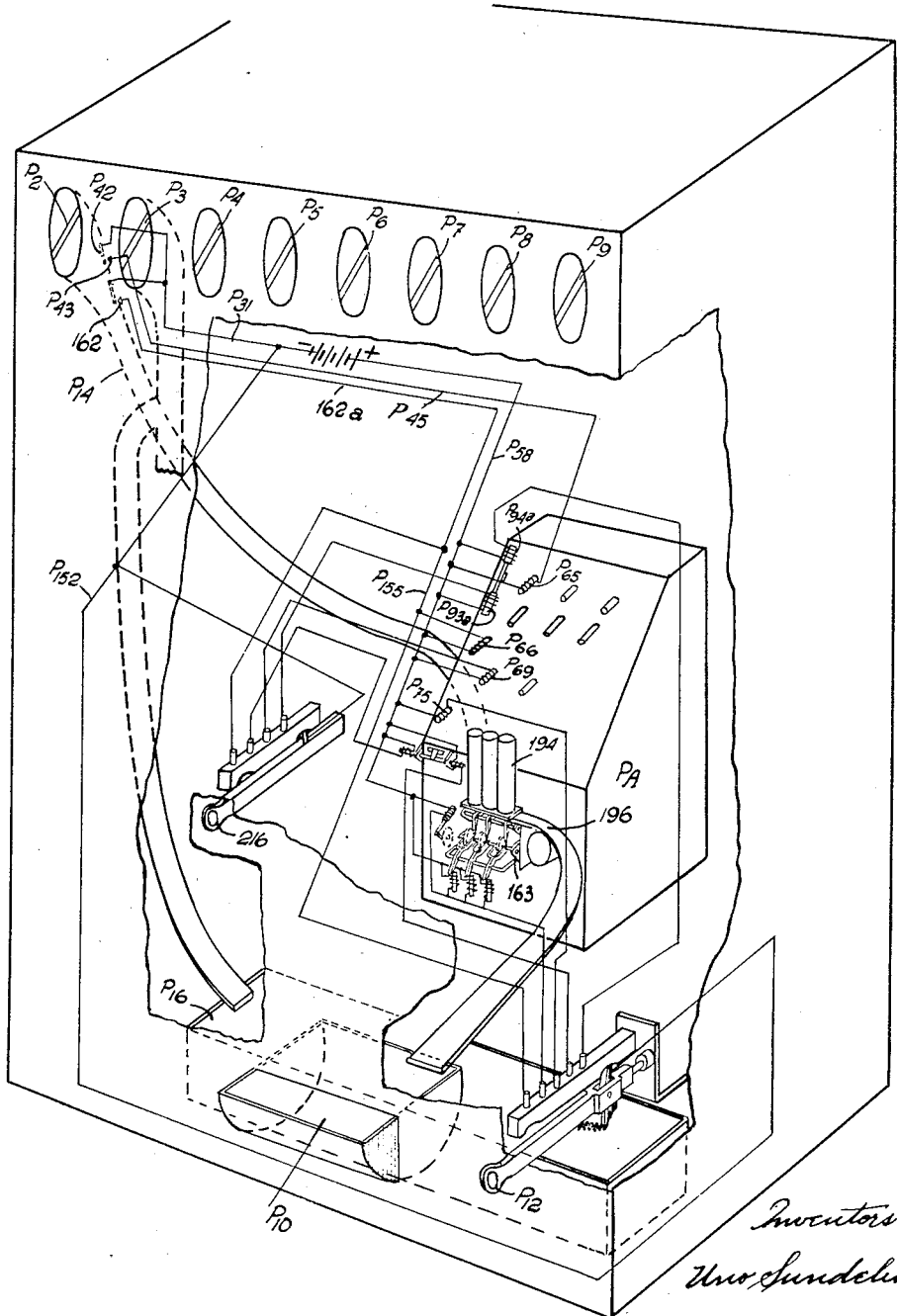

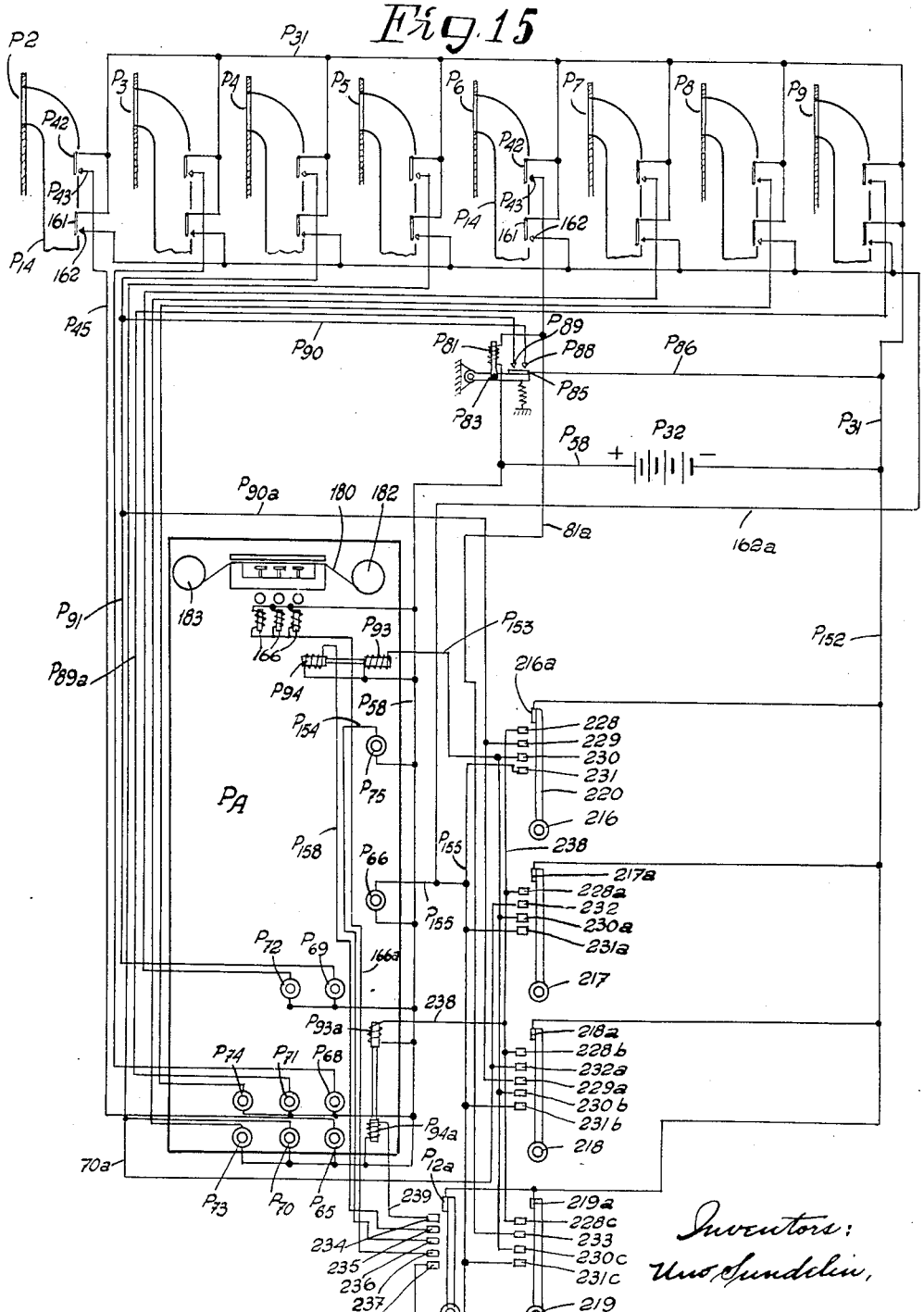

Nov. 23, 1937.　　U. SUNDELIN ET AL　　2,100,061
COIN REGISTERING AND CALCULATING APPARATUS
Filed Feb. 17, 1932　　20 Sheets-Sheet 8
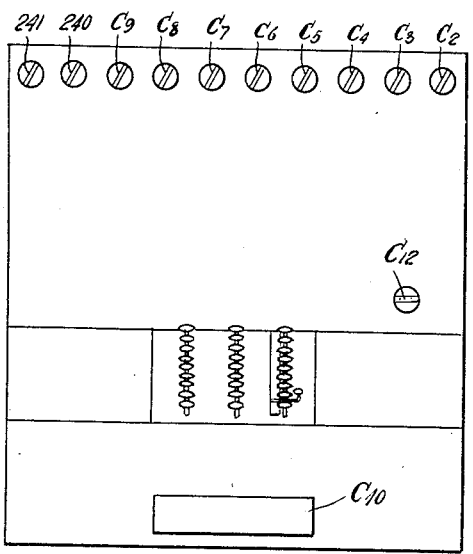
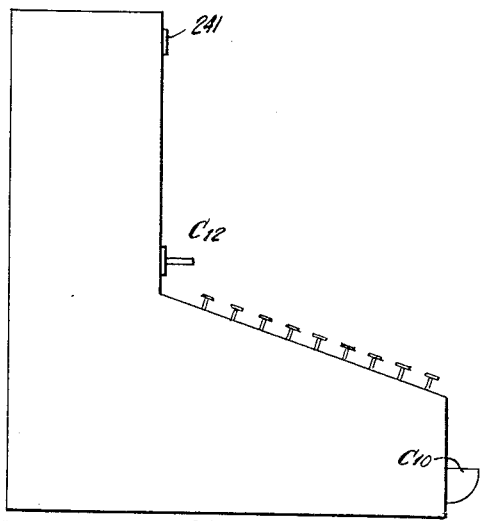
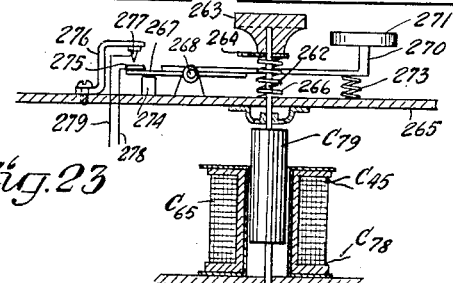
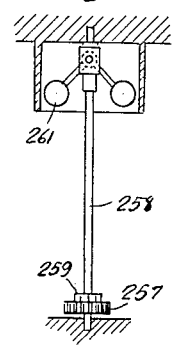

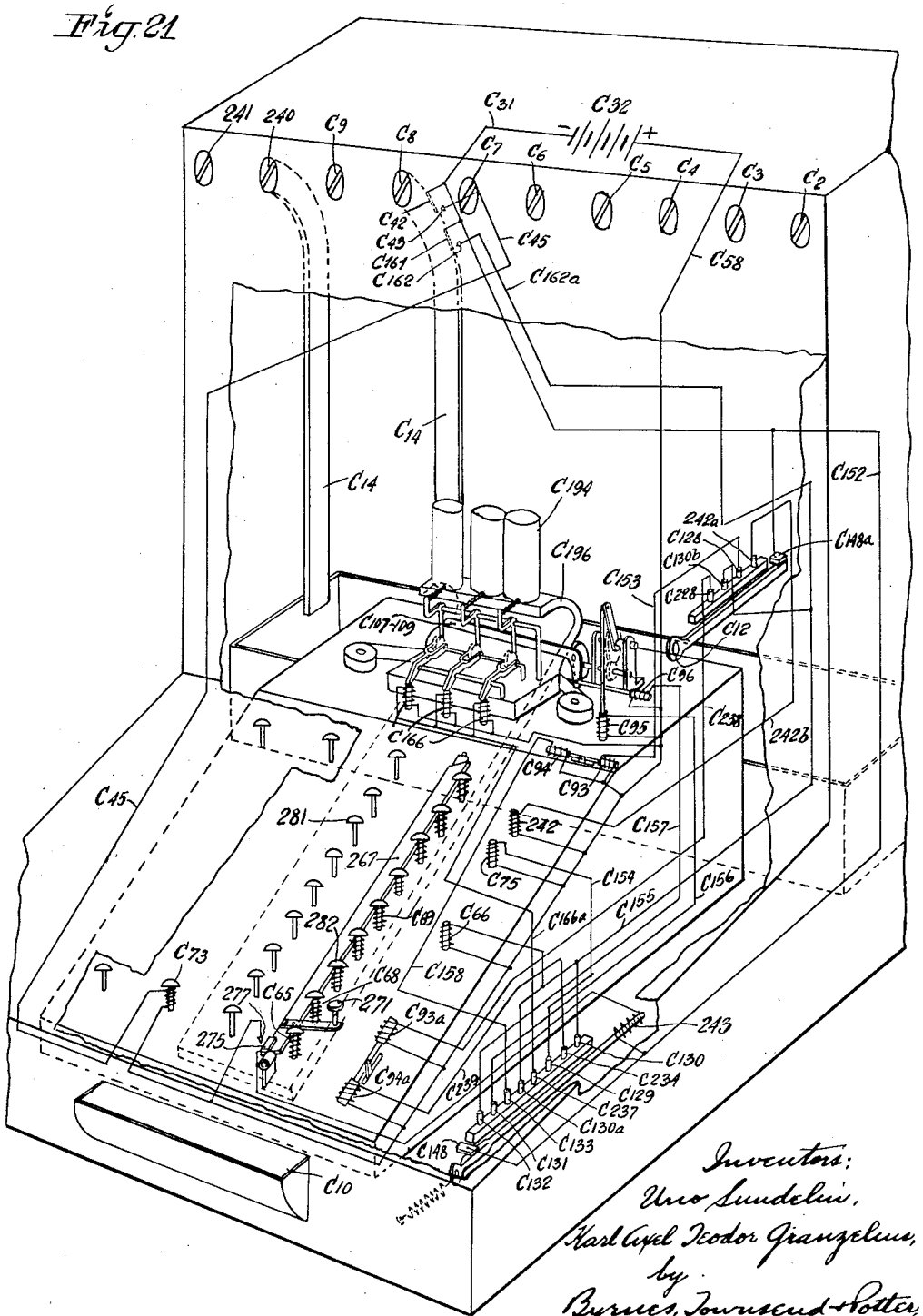

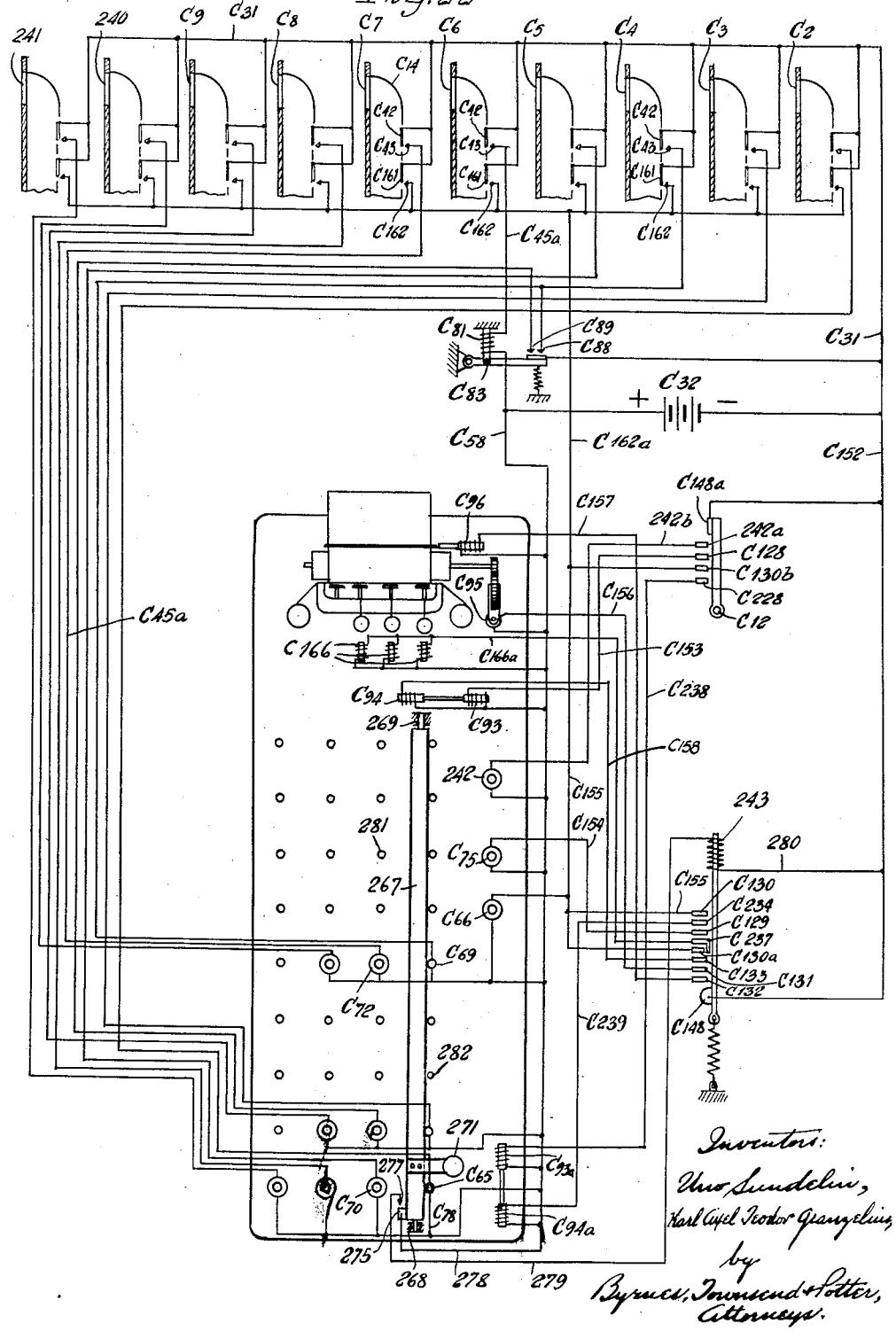

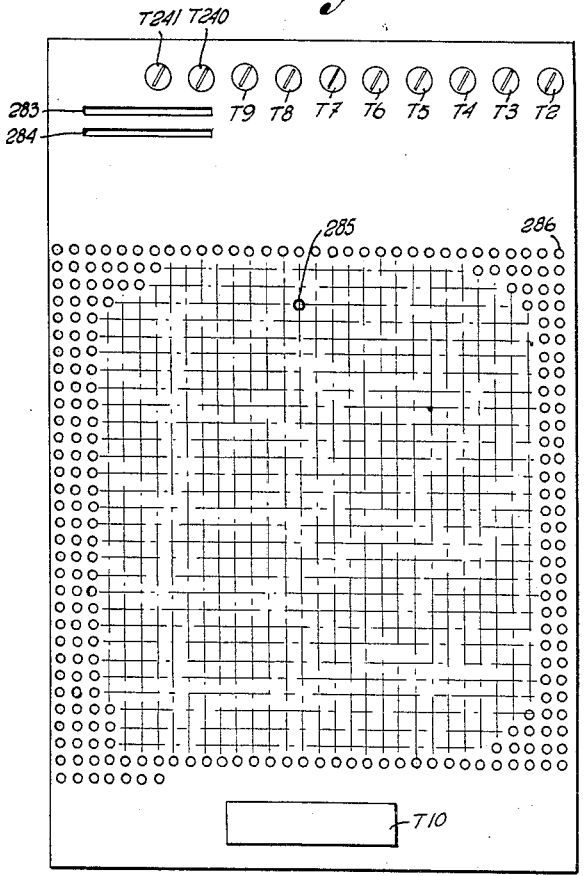
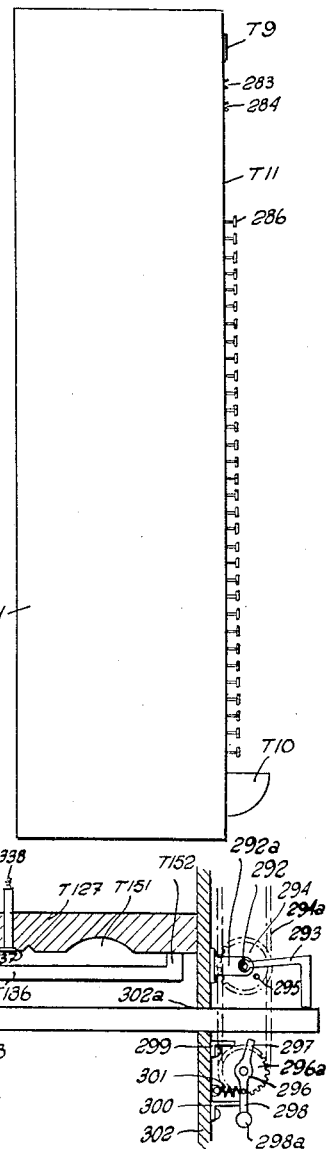

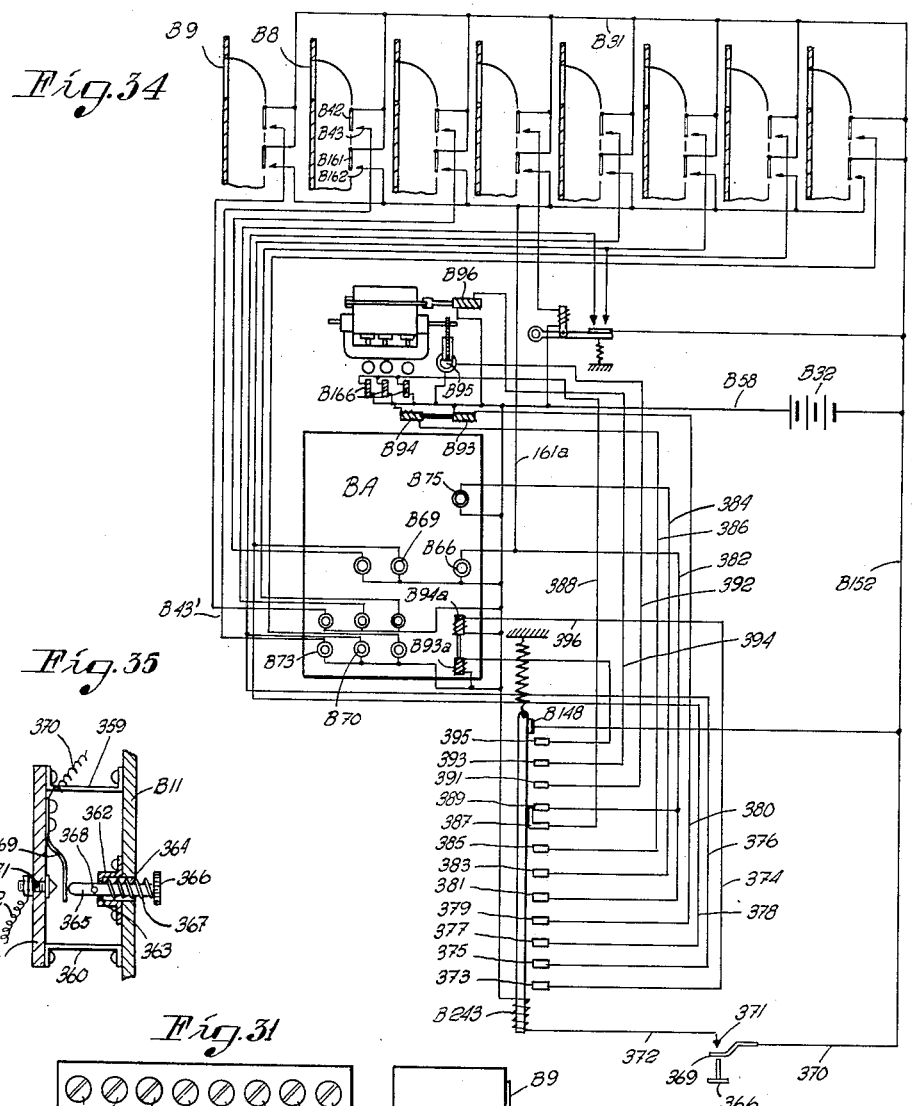

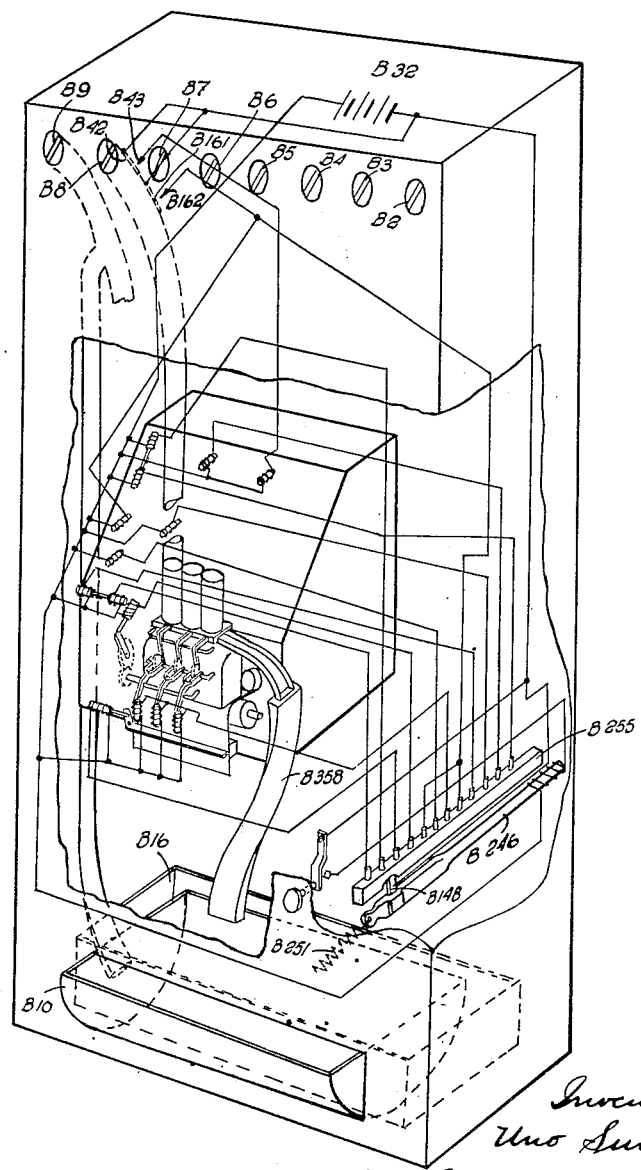

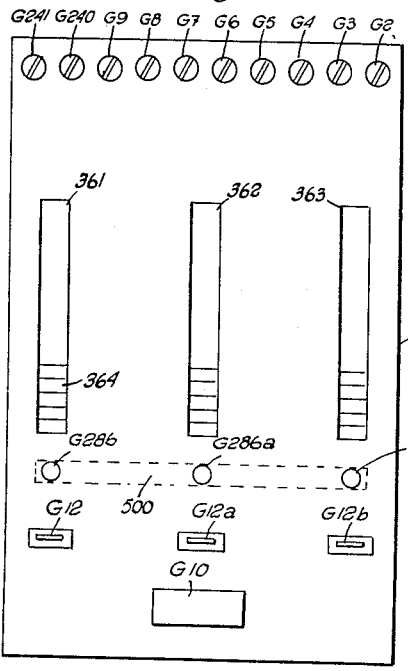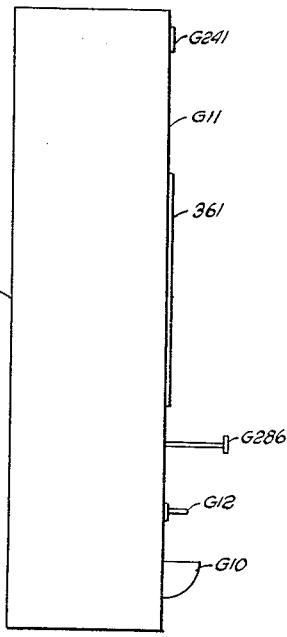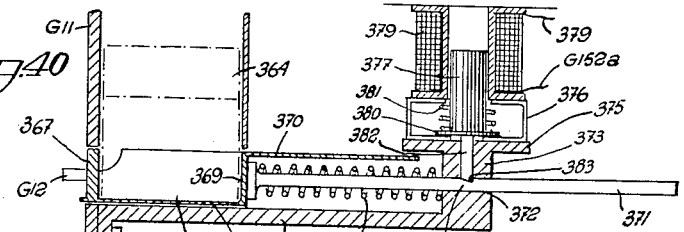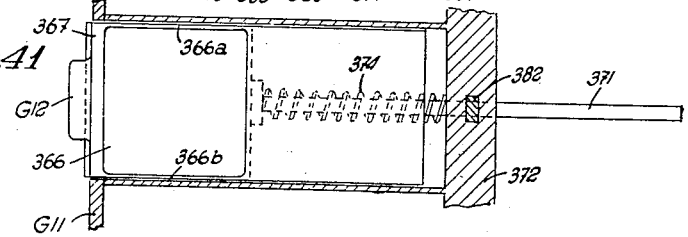

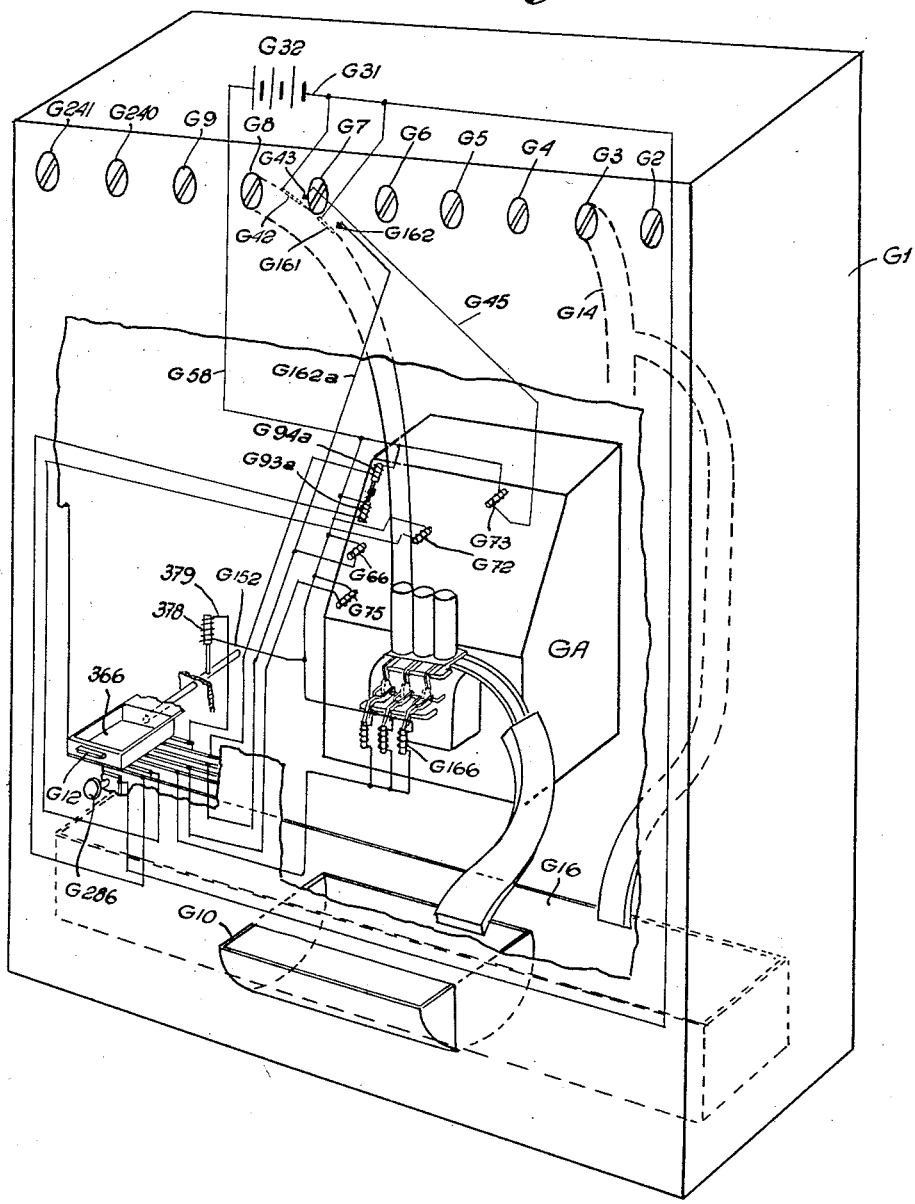

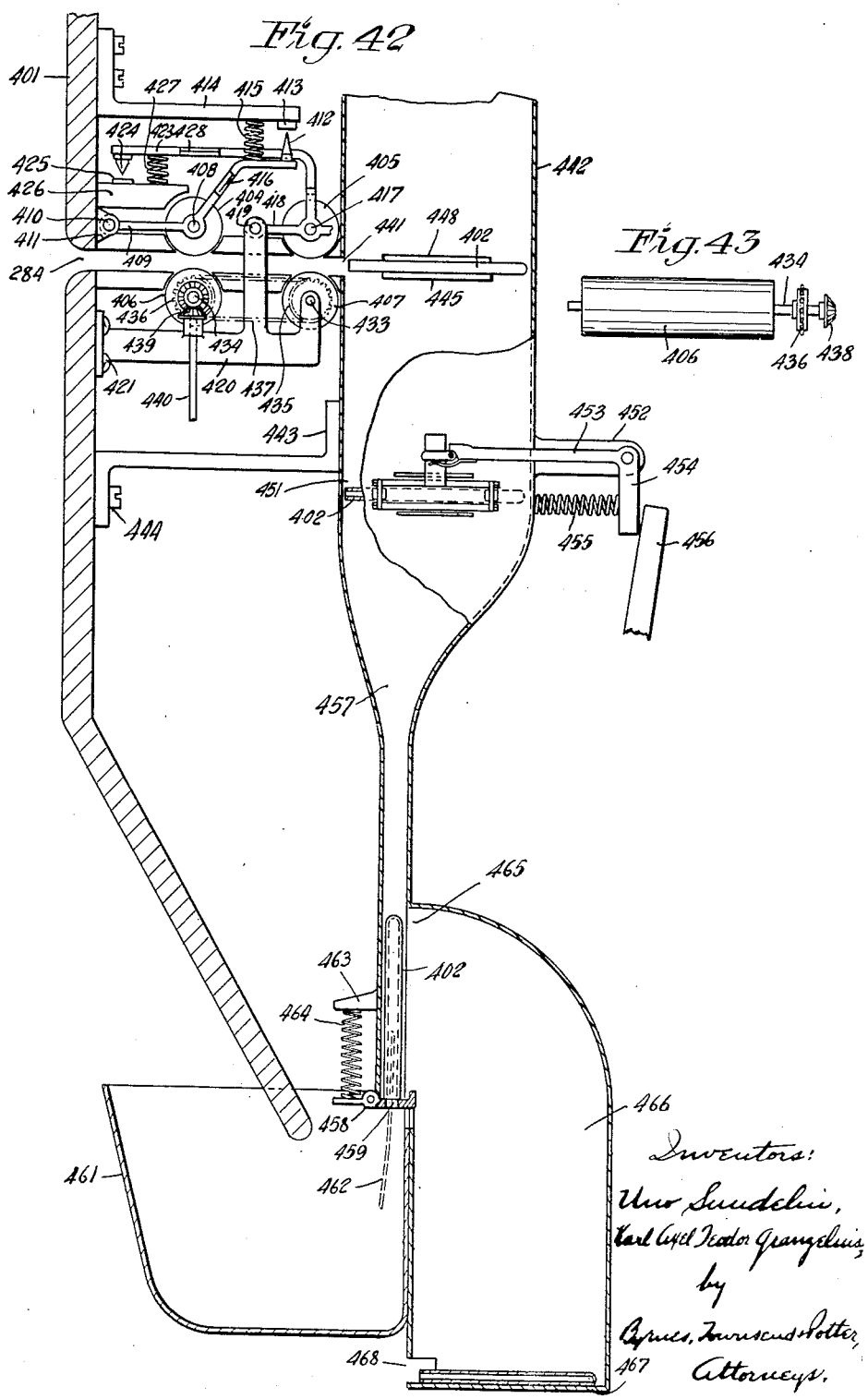

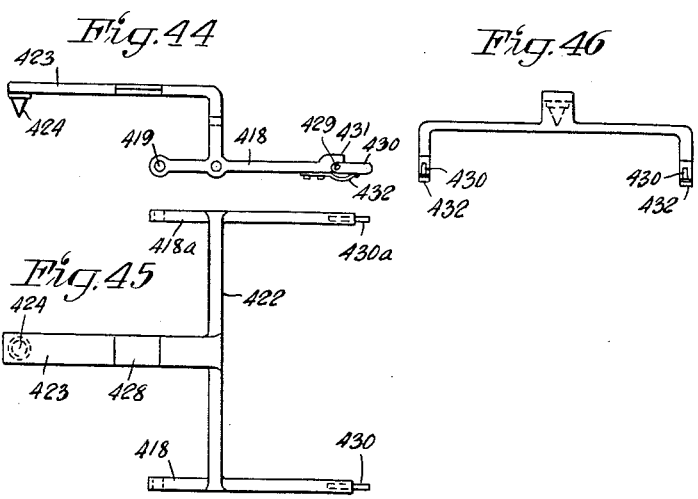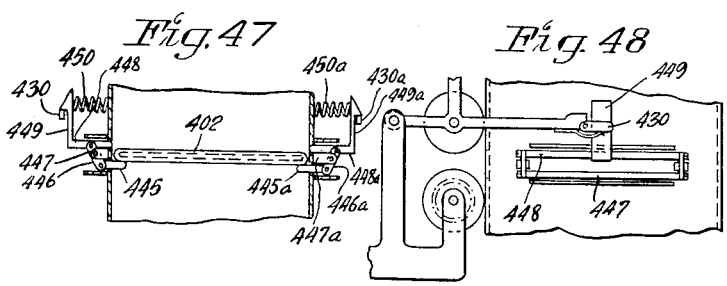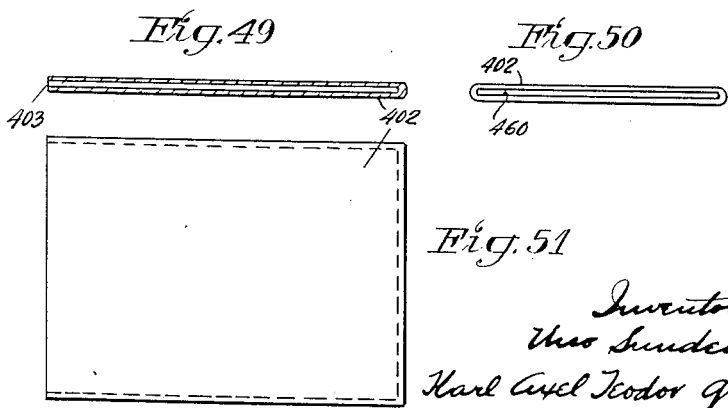

UNITED STATES PATENT OFFICE 2,100,061

COIN REGISTERING AND CALCULATING APPARATUS

Uno Sundelin and Karl Axel Teodor Granzelius, Stockholm, Sweden, assignors of part interest to Fredrik Hammaren, Stockholm, Sweden Application February 17, 1932, Serial No. 593,660
In Sweden November 2, 1926

19 Claims. (Cl. 194—10)

This application is a continuation in part of application Serial No. 224,534, filed October 7, 1927 and, as to common subject matter, relates back to said application Ser. No. 224,534 for all dates and rights incident to the filing thereof and the filing of foreign applications corresponding thereto.

This invention relates to coin registering and calculating apparatus and has for its object to provide an improved device of this kind.

The improved apparatus differs from the hitherto known kind by the fact that, instead of the usual manually operated press buttons or keys, means are provided to enable the values of the coins inserted into the apparatus to be automatically registered through the intermediary of the coins themselves, whereby every risk of a false registration of a sum paid is avoided.

Further, the apparatus may be so designed that an automatic repaying of a certain amount will take place, if the inserted coins exceed the amount to be paid or to be deposited in each special case. The apparatus may also be so designed that it delivers a card on which the amount to be registered is indicated, and this, even if the money inserted into the apparatus exceeds the said amount.

By suitable additional arrangements which will be described in the following in connection with the arrangements illustrated in the annexed drawings, the apparatus may, in addition, be so designed that it may be able to print stamps of a desired value, corresponding to the amount paid, on postal transmittances or the like inserted into the apparatus. Further, by means of a suitable design of certain additional arrangements in the apparatus, this latter may be adapted to automatically deliver tickets for theatres, railways and the like, in which case not only tickets of a certain price may be obtained, but also, for instance in the case of threatre tickets for a certain place in the threatre. Instead of delivering a card, a cash receipt or the like, the present device may, of course, be designed in such a way as to deliver certain desired goods.

When using the apparatus, for instance, as an automatic savings-bank for depositors, in which case the depositors receive, instead of the amount paid, a receipt binding on the bank, the apparatus may be provided with additional controlling means in order to protect the bank against false coins. Such means may consist of coin-scales which automatically eject the coin out of the apparatus without any recording taking place, if the coin is too light or too heavy. As, however, false coins of correct weight may be inserted, the apparatus may, in addition be provided with arrangements which automatically mark all the coins inserted by the depositor at a certain deposition, by means of a certain sign, figure or the like, which sign at the same time, is also printed on the depositor's payment receipt.

Other features of the invention will be more particularly described in the following in connection with the description of the arrangements shown in the annexed drawings which in some cases are purely diagrammatical.

Referring to the drawings details corresponding to each other, but belonging to different embodiments of the apparatus are indicated by same reference characters provided with a special prefix.

Figure 1:
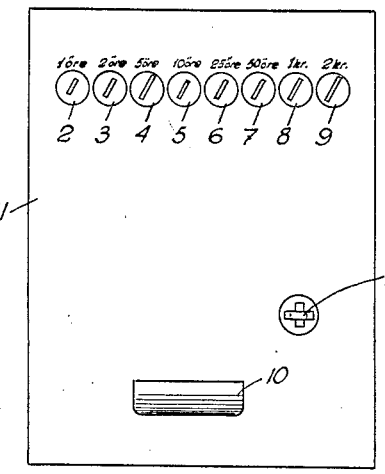
Figure 2:
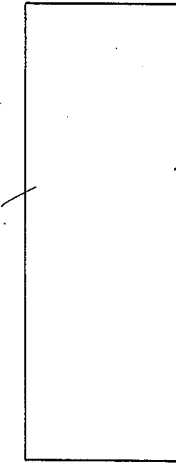
Figure 3:
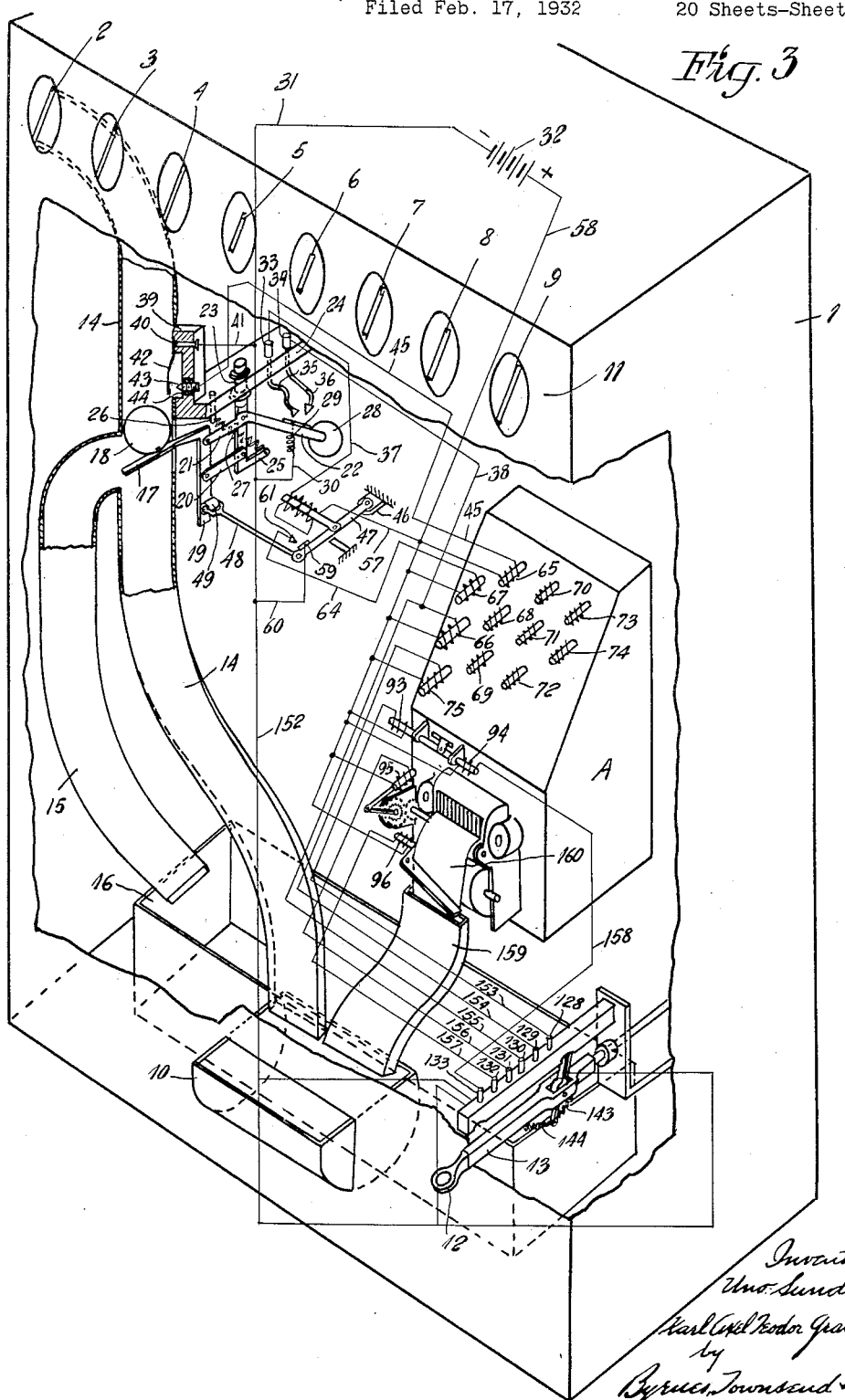

Fig. 1 is an elevational view of an apparatus adapted to serve as automatic savings-bank. Fig. 2 is a side view of the apparatus shown in Fig. 1. Fig. 3 shows perspectively a fragmental view on a larger scale of the apparatus shown in Figs. 1 and 2, some parts being broken away to show the interior of the apparatus, the electrical connections being shown very diagrammatically. Fig. 4 is a diagram of connections for the details shown in Fig. 3. Fig. 5 shows on a larger scale an electromagnet, partly in section, for actuating a key of the calculating machine shown in Fig. 3. Fig. 6 shows on a larger scale a weighing mechanism for coins inserted in the apparatus. Fig. 7 shows on a larger scale a change-over gear for a lever on the calculating machine. Fig. 8 shows on a larger scale a cutting mechanism mounted on the calculating machine. Figs. 9 and 10 show on a larger scale and in an end view and a side view, respectively, a feeding mechanism for cash receipts. Fig. 11 shows on an enlarged scale a handle with contact device as used in connection with the apparatus shown in Figs. 1, 2 and 3. Similar devices will also be used in connection with the modified forms of the apparatus to be referred to later.

Figs. 12 and 13 show in the same manner as Figs. 1 and 2 a modified apparatus adapted to serve as postage device. Fig. 14 shows similarly to Fig. 3 the interior parts of this modified apparatus. Fig. 15 is a diagram of connections for the apparatus shown in Figs. 12, 13 and 14. Fig. 16 shows on a larger scale a coin discharging mechanism as used in the apparatus shown in Fig. 14. Fig. 17 is an elevational view of a blocking device and Fig. 18 shows a detail of this blocking device.

Figs. 19 and 20 show similarly to Fig. 1 and 2 a modified apparatus adapted to serve as cash register. Fig. 21 shows similarly to Fig. 3 the interior of this cash register. Fig. 22 is a diagram of connections for this cash register. Fig. 23 shows a modified form of an electromagnet for actuating a key of the cash register. Fig. 24 shows, partly in section, a contact gear actuated by an electromagnet. Fig. 25 shows in section a governor device used in conjunction with the contact gear shown in Fig. 24.

Figure 29:
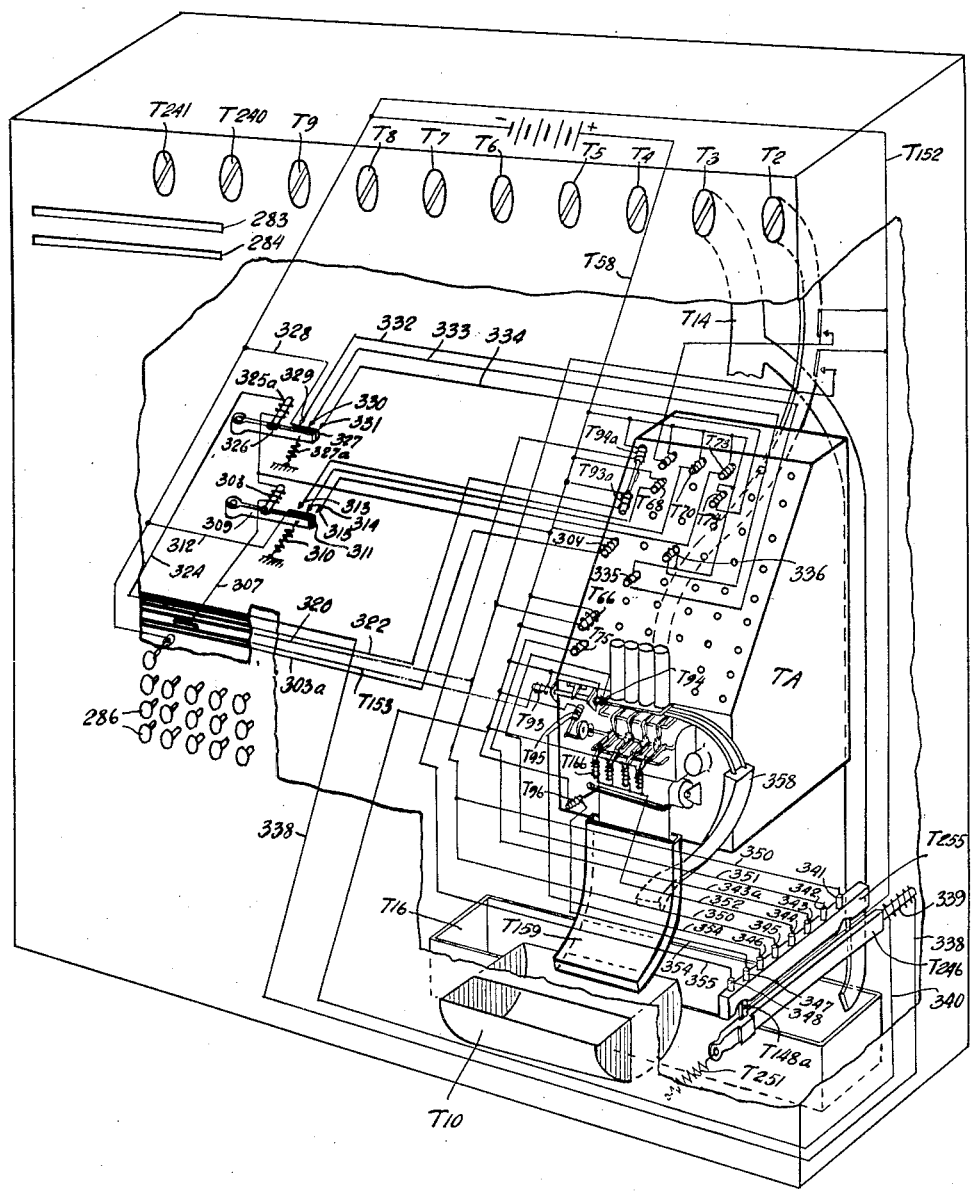
Figure 30:
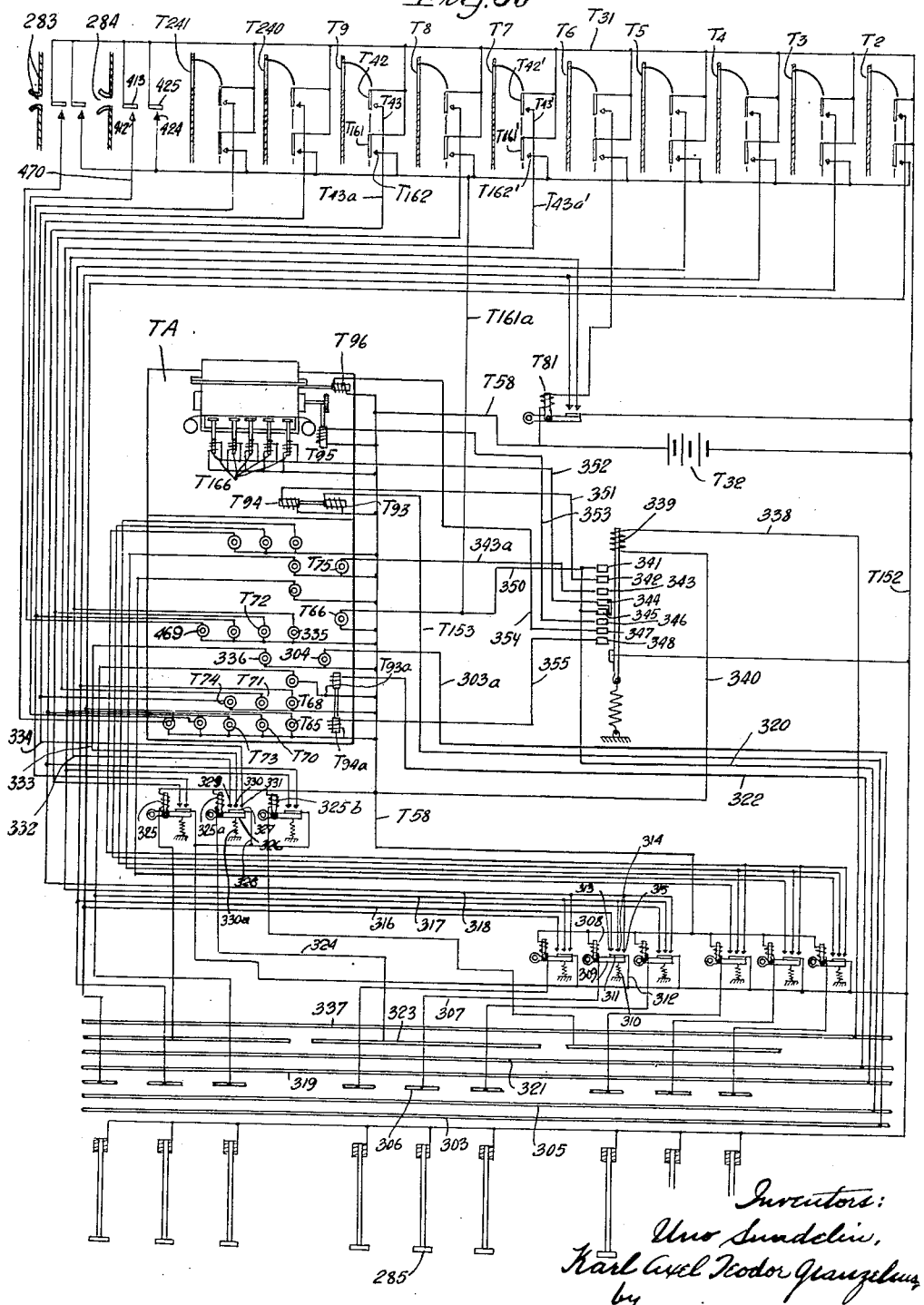

Figs. 26 and 27 show in the same manner as Figs. 1 and 2 a modified apparatus adapted to serve as apparatus for printing and selling tickets for threatres and the like. Fig. 28 shows in detail one of the keys corresponding to a certain place in the theatre. Fig. 29 shows the interior of the apparatus. Fig. 30 shows a diagram of connections for this apparatus.

Figs. 31 and 32 show in a similar manner as Figs. 1 and 2 a modified apparatus for use in connection with the printing and selling of tickets on omnibuses, tramways, railways or the like. Fig. 33 shows the interior of the apparatus. Fig. 34 shows a diagram of connection for this apparatus, and Fig. 35 shows details of an operating member.

Figure 39:
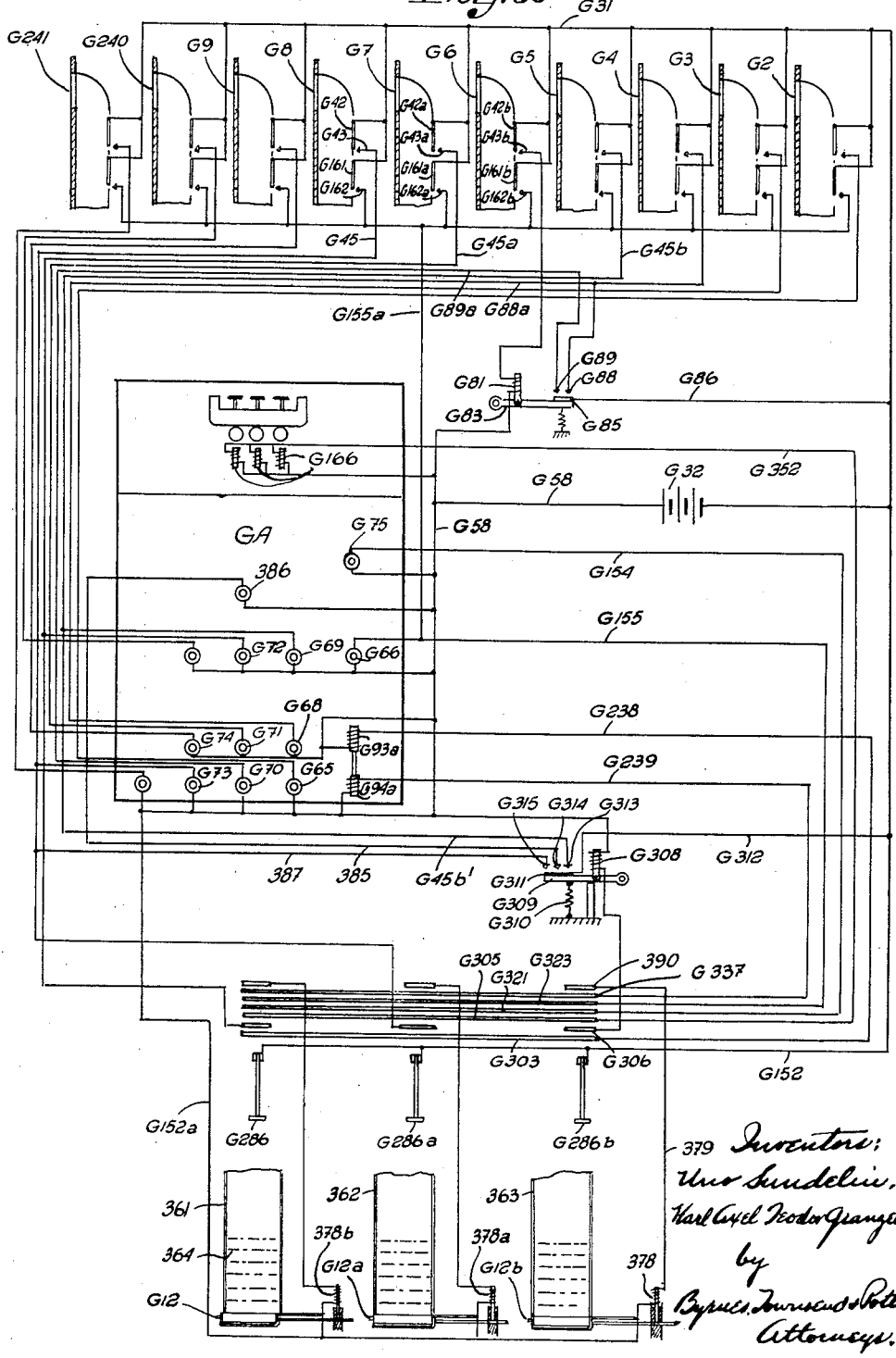

Figs. 36 and 37 show external views of another modification of the apparatus according to the invention and adapted for selling goods. Fig. 38 shows internal parts of the apparatus. Fig. 39 shows a diagram of connection for this apparatus. Fig. 40 is a vertical section through a mechanism for operating a drawer containing the goods to be sold. Fig. 41 is a horizontal section through this mechanism.

Fig. 42 shows a sectional view of a mechanism adapted to be operated by bank notes. Fig. 43 shows a lateral view of a feeding cylinder. Figs. 44–46 show a contact device in three different views. Fig. 47 is a section through a releasing mechanism. Fig. 48 shows a lateral view of this mechanism. Figs. 49–51 show a loose pocket in three different views.

Referring first to the apparatus shown in Figs. 1–11, the various details of the apparatus are mounted in a casing 1 of metal or other suitable material. The front plate 11 of the casing 1 is provided with coin slots 2, 3, 4, 5, 6, 7, 8 and 9 (Fig. 3) for coins of different values. In the example shown slot 2 is destinated for Swedish 1 öre-coins, slot 3 for 2 öre, slot 4 for 5 öre, slot 5 for 10 öre, slot 6 for 25 öre, slot 7 for 50 öre, slot 8 for 1 crown and slot 9 for 2 crowns. It is, of course, to be understood that the invention is not limited to the use of Swedish coins and the apparatus will function in precisely like manner, when other coins are used, in which case the slots and other details must be somewhat modified to suit the coins employed. At the lower part of the front plate 11 is a trough-like member 10 open at the top and projecting partly at the outside of the front plate 11 and partly towards the interior of the apparatus. Into that part of the member 10, which lies behind the front plate, extend channels to be described later (Fig. 3). Through the front plate 11 extends a handle 12 integral with a rod 13 (Fig. 11), which supports an electrical contacting device to be more fully described later.

The apparatus according to the present invention is adapted to cooperate with a computing machine of any suitable type which is operated electro-mechanically. Various types of commercial computing machines are well adapted for cooperation with apparatus constructed in accordance with the invention and, for purposes of illustration, we have illustrated a computing machine of the addition and subtraction type which is sold under the trade designation "Burroughs, Model 9, 10, 51." Such a computing machine is mounted within the casing 1 and is generally denominated "A". One object of the present invention is to modify certain details of such computing machine in order to make this latter suitable for the arrangements according to the present invention. It, therefore, is to be understood that although a particular type of computing machine has been shown, any other electrically operated computing machine may be utilized. The various keys, cranks, levers usually employed in this type of computing machines have been shown very diagrammatically, as the present invention is only concerned with the principal function of said members but not with the detailed construction of same. For the same reason such members have been left out on the drawings, which not directly are necessary for the proper function of the arrangements according to the present invention. Detailed disclosures of the construction and operation of electrically operated computing machines are available in the technical literature, such as the United States Patents 1,853,050 and 1,853,053, Allan A. Horton, issued April 12, 1932.

For the sake of clearness solely the channel means associated with the coin slot 2 have been shown in Fig. 3, the other coin slots 3—9 being, of course, associated with similar channel means, and in the diagram of connections shown in Fig. 4 the upper portions only of the channel means have been indicated.

Coin slot 2 is connected to a channel 14 which extends through the apparatus and opens into the trough 10. A channel 15 branches off from the channel 14 and opens into a coin box 16 placed on the bottom of the casing 1. Into the channel 14, about at the center of the opening of the branch channel 15, projects a weighing beam 17. A coin 18 has been shown on this weighing beam at the moment, when the coin just has reached the weighing beam but has not yet pressed it down. The weighing beam 17 with the parts associated therewith is more clearly shown in Fig. 6 and will now be described in detail. Fig. 6 shows this weighing device as looked upon from above. The weighing beam 17 constitutes one arm of an angular piece, the other arm 19 of which is pivoted to a link 20 and to a double-armed lever 21, 22. The other ends of the link 20 and of the lever 21, 22 are pivoted to a vertical member 23 which is rotatably mounted in a bracket 24 fixed to the casing 1 in appropriate manner. This vertical member 23 has an extension 25 at right angles thereto, and between said extension and a pin 26 fixed to the bracket 24 is mounted a tensioned spring 27 which tends to rotate the vertical member and the parts associated therewith in counter-clockwise direction, when seen from above (Fig. 6). The arm 22 of the double-armed lever is provided at its free end with a counterweight 28, and between the counterweight and the pivot of the lever a contact plate 29 is attached to the latter. This plate is connected by a flexible wire trical source, for instance an accumulator 32. The bracket 24 also supports two insulators 33 and 34, through which extend two flexible contact members 35 and 36 which are arranged opposite to the contact plate 29 and at various distances above the same, contact member 35 being closer to the plate 29 than the member 36 for the purpose to be described later. To the contact member 35 is attached a wire 37 and to the contact member is attached a wire 38.

From the bracket 24 extends upwardly a minor bracket 39 supporting a contact pin 40, one end thereof being connected by a wire 41 to the wire 31 and thus to the accumulator 32. To the other end of this pin 40, which projects into the channel 14 is attached a flat contact spring 42, the free end of which is normally at some distance from a contact pin 43 fixed in an insulator 44 in the bracket 39. This pin 43 is connected to an insulated wire 45.

To counteract the action of the spring 27 and to keep the weighing beam 17 in the channel 14 normally in the path of the coin 18 inserted in the slot 2, the following arrangement is provided, Figs. 3 and 6. Attached to casing 1 is a bracket 46 which pivotally supports an arm 47, to the free end of which is pivoted a rod 48 extending at right angles from the arm 47 and carrying at its free end a roller 49 in contact with the vertical arm 19 of the angle piece 17, 19. The rod 48 is guided by appropriate guiding members 50, 50a. To a bracket 51 is fixed a stop member 52 which forms an abutment for the arm 47, so that the parts normally assume the positions as indicated in Fig. 6. Between the ends of the arm 47 is pivotally attached thereto a core 53 for an electromagnet 54 which carries two windings, one 55 of which is short-circuited and constitutes a damping coil, when the magnet is excited by the other coil 56. One end of this coil 56 is connected to the wire 37 and the other end is connected by a wire 57 and a lead 58 (Fig. 3) to the positive pole of the accumulator 32. Further, the arm 47 is provided with a contact plate 59. Opposite to this contact plate 59 is a contact pin 61 which by means of a spring 62 is resiliently mounted in a bracket 63 of insulating material. The contact plate 59 is connected by a flexible wire 60 to the lead 31 and thus to the minus pole of the accumulator 32, while the contact pin 61 is connected to a wire 64. The wire 45 is connected to one end of a coil 65, the other end of which is connected with the lead 58. The wire 38 is connected to one end of a coil 66, the other end of which is connected with the lead 58. The wire 64 is connected to one end of a coil 67, the other end of which is connected to the lead 58. The coil 65 is mounted in register with that key of the calculating machine A, which corresponds to the value 1-öre. Similar coils 68—74 are mounted over the keys corresponding to the other money values from 2-öre to 2 crowns, compare Figs. 1 and 4. The coil 67 is mounted over the usual "correction" key, the coil 66 is mounted over the device which brings about a coupling between the motor (not shown) of the calculating apparatus and the counting mechanism of the latter, and a further coil 75 is mounted over the key effecting, when pressed down, the totalizing, as is usual in this type of calculating machines. All these coils 65—75 are of the type as shown in Fig. 5. They are fixed to the top plate 76 of the calculating machine by means of brackets 77, 78, and in the interior of each coil is a core 79 directly connected with the usual stem 80 leading to the key levers of the machine A. One end of the winding of these coils is connected to the wire 58 and the other end is connected to the contact member 43 in the channel 14. All contacts 35 are coupled in parallel and connected to the wire 37, and all contacts 36 are coupled in parallel and connected to the wire 38 (Fig. 4).

With respect to the coin slot 6 adapted for Swedish 25-öre coins, a special arrangement is necessary, inasmuch as the calculating machines of normal type have no special key for 25-öre, although such special key could, if desired, be fitted to the machine. The said special arrangement is adapted to show that according to the present invention care will be taken also of such special coins as Swedish 25-öre coins. For said coin slot 6 a special relay device is thus provided. The contact 43 in the channel 14 is not directly connected to a coil on the key board of the machine A and instead thereof is connected to a special coil 81 having a core 82, the other end of the coil 25 being connected to the wire 58 and thereby to the positive pole of the accumulator 32. An armature 83 for said coil 81 is pivoted, at 84, to the frame of the apparatus and supports a contact plate 85 which by a flexible wire 86 is connected to the negative pole of the accumulator. The armature is kept at a certain distance from the core 82 by means of a spring 87. Opposite to the contact plate 85 are situated two contacts 88 and 89. Contact 88 is connected by means of a wire 90 to the wire 91 leading from the 5-öre coin slot 4 to the pertaining coil 69 on the key board of the machine A, while the contact 89 is connected by means of a wire 92 to the 20-öre coil 71 on the key board. By inserting a 25-öre coin into the slot 6, contact device 42—43 will be closed, thereby exciting coil 81 in the circuit, battery 32, wire 58, coil 81, contact 43—42, wire 31 and battery 32. Hereby the armature is attracted, so that the contact device 85, 88—89 is closed and both coils 69 and 71 are excited in the circuit: battery 32, wire 58, coils 69 and 71, wires 91—90 and 92, respectively, contacts 88, 89, contact plate 85, wire 86 and battery 32.

On the calculating machine A are further mounted two coils 93, 94 for setting the machine into "printing" or "non-printing" position, one coil 95 for the paper feeding mechanism and one coil 96 for the "knife" mechanism.

The mechanism for setting the machine into "printing" or "non-printing" position is shown in detail in Fig. 7. Normally the mechanism is in "non-printing" position, in order that several coins may be inserted into the apparatus and registered in the calculating machine without that the amounts of the various coins are printed before "totalizing" the same. The coils 93 and 94 are mounted in axial alignment on the top plate 76 of the calculating machine. Through the openings of the coils extends a rod 97 with two cores 98 and 99, one for each coil. The rod 97 is axially displaceable in supports 100 and 101, and between these supports the rod 97 carries a pin 102 projecting into a slot 103 in a lever 104 which is adapted, in a well known manner, to change the printing mechanism of the calculating machine over into the two positions above referred to. When the coil 93 is excited, the rod 97 and thereby the lever 104 will be moved to the right, as indicated with dash-dotted lines, that is into the "printing" position, and when the coil 94 is excited obviously the movement is reversed.

The knife mechanism is shown in detail in Fig. 8. Into the opening of the coil 96 extends a core 105 which by means of a link 106 is pivotally connected to the movable member 107 of the knife, which member is journalled on a stud 108 on the fixed member 109 of the knife. The two members 107 and 109 are further interconnected by a spring 110, and between the two members has been indicated a paper strip 111 to be severed from the supply mounted in usual manner on the calculating machine. Obviously, when the coil 96 is excited, the movable member 107 of the knife will be drawn into engagement with the fixed member 109, thus cutting the paper strip 111.

The paper feeding mechanism is shown in detail in Figs. 9 and 10. The partly shown paper platen 112 is fixed to a spindle 113 journalled in two supports 114, one only of which has been shown. To the spindle 113 is further securely fastened a gear wheel 115 with a smaller number of teeth in engagement with another gear wheel 116 with a greater number of teeth, so that on the rotation of the wheel 116 the wheel 115 will perform a greater movement than the wheel 116. The wheel 116 is fixed on a bushing 117 to which is further fixed a ratchet wheel 118, and which is rotatably journalled on a stud 119 fixed to the support 114. About the bushing is rotatably arranged an arm 120 carrying a spring pawl 121 in engagement with the ratchet wheel 118. To prevent this ratchet wheel to rotate in opposite direction, a spring actuated pawl 122 is provided, which is pivoted at 123 to the support 114. Between the upper end of the support 114 and the free end of the arm 120 is attached a spring 124 tending to move the arm in counterclockwise direction, when looked upon in Fig. 10. To limit this movement a stop 125 is fixed to the support 114. Into the opening of the coil 95 extends a core 126 which is connected by means of a link 127 to the free end of the arm 120. When the coil 95 is excited, the arm 120, will be swung in clockwise direction thereby carrying along the ratchet wheel 118 through the intermediary of the spring pawl 121, and also the gear wheels 116, 115, will be rotated, so that the paper platen will be rotated in counter-clockwise direction. When thereupon the coil is demagnetized, the spring 124 draws the arm in counter-clockwise direction, the spring pawl 121 gliding over the teeth of the ratchet wheel 118 which is blocked by the pawl 122.

The apparatus is further provided with a special contacting device to be operated by a handle accessible from the outside of the apparatus. By means of this device the whole apparatus is set into function as will be explained later. The handle 12 is integral with the rod 13 displaceably arranged in the front wall 11 of the apparatus and in another wall 126 parallel to the front wall. Between these two walls is fixed a plate 127 of insulating material supporting contact pins 128—135. A contact bar 136 is mounted on this plate 127 at a certain distance therefrom. The rod 13 is connected with the wall 126 by means of a spring 137 tending to draw the rod 13 to the right (Fig. 11). One end of the spring 137 is attached to a fastening member 138 screwed into the wall 126, while the other end thereof is attached to a minor post 139 screwed into the rod 13. Pivoted at 140 to the rod is a double-armed lever 141, 142, one arm 141 of which has attached thereto two springs 143, 144 which are attached with their other ends to eyelets 145, 146 screwed into the rod 13. By this spring means the lever is normally held substantially at right angles to the longitudinal extension of the rod. The other arm 142 of the lever carries a plate 147 of insulating material, to which is fixed a spring contact member 148 bent at an angle and adapted with one part thereof to resiliently glide on the contact bar 136 and with the other part to glide over the heads of the contact pins 128—135. The plate 127 of insulating material is provided with small triangular notches 149 between each pair of contact pins 128—129, 129—130 and so on, and further provided with arcuated recesses 150 and 151 opposite to the lever arm 142, when the rod 13 is positioned in either of its two end positions. When the handle is drawn forward, the lever arm 142 will abut against the edge of the recess 150 and thereby be swung about its pivot 140 in clockwise direction against the action of the spring 143, the spring 144 then becoming slack, while the spring 137 is put under tension. The contact member will then glide over the heads of the contact pins 128—135, thereby closing circuits, as will be described later, the contact bar 136 being connected to the negative pole of the battery 32 by means of a wire 152. In case the handle is not entirely pulled out, so that all circuits over the contact pins 128—135 have been closed, that is to say the lever has not reached the recess 151, the rod 13 cannot return to its initial position for the reason that the lever arm 142 will engage one of the notches 149 which thus act as stop devices. On the rod 13 having been pulled out its entire stroke and the lever arm 142 having reached the recess 151, the lever 141, 142 is again straightened by the action of the spring 143. Now, when the handle 12 is again released by the operator, the spring 137 draws the rod 13 back to its initial position, the lever arm 142 then abutting against the edge of the recess 151, so that the lever will swing about its pivot in counter-clockwise direction and the contact member 148 cannot come into engagement with the heads of the contact pins 135—128 on the return stroke of the rod 13, because the metallic part of the lever arm 142 will touch said head, from which part, however, the contact member 148 is insulated by the plate 147. The contact pins 128—135 are connected to the various coils on the calculating machine in the following manner (see Fig. 4). Contact 128 is connected by a wire 153 with coil 93 for setting the calculating machine into "printing" position, contact 129 is connected by a wire 154 with coil 75 for the totalizing key, contact 130 is connected by a wire 155 to coil 66 for the motor clutch device, contact 131 is connected by a wire 156 to coil 95 for the paper feed device, contact 132 is connected by a wire 157 to coil 96 for the knife device and contact 133 is connected by a wire 158 to coil 94 for setting the calculating machine again into "non-printing" position. The contacts 134—135 are reserve contacts which may be utilized for special purposes, for instance, in other apparatus to be described later.

It is to be noted that the calculating machine A is mounted upside down with its bottom attached to the back plate of the casing 1 of the apparatus, the key board being situated above and the paper platen below (Fig. 3). The paper strip extends into a channel means 159 which opens into the trough 10, so that the severed paper voucher may be taken out. In Fig. 4 the calculating machine A has for the sake of clearness and in order to be able to better follow the electrical circuits been shown in its normal proper position, the paper strip 160 showing the amount 1.35 printed thereon.

The apparatus above described operates in the following manner. Assuming at first that the coin inserted in the slot 2 has too light a weight, the following takes place (Figs. 3 and 4): The coin 18 presses the contact spring 42 against the contact pin 43, closing momentarily the circuit: Battery 32, wire 58, coil 65 for the 1-öre key, wire 45, contact 43, contact spring 42, wire 31 and battery 32. The coil 65 will be excited and the 1-öre key pressed down and kept in this pressed down position, as is usual with this type of calculating machines. The coin 18 will then reach the weighing beam 17, pressing the same down only a little amount on account of its light weight, so that the contact plate 29 will only touch the contact 35 but not the contact 36, the coin 18 still being kept in the upper part of the channel 14 above the branch channel 15 and on the weighing beam 17. The following circuit will then be closed: Battery 32, wire 58, wire 57, coil 56, wire 37, contact 35, contact plate 29, wire 30, wire 31 and battery 32. The coil 56 will be excited, thereby rocking the arm 47 (Fig. 6) about its pivot and pushing the weighing beam 17 in a horizontal direction about its pivot 23, so that the coin 18 will fall down from the weighing beam 17 direct into and through the lower part of the channel 14 into the trough 10, wherefrom it may be taken out. About at the end of the horizontal movement of the arm 47, the contact plate 59 will engage the resilient contact 61, closing the following circuit: Battery 32, wire 58, coil 67, for the correction key on the calculating machine, wire 64, contact 61, contact plate 59, wire 60, and battery 32. The coil 67 will be excited and presses down the correction key, so that the 1-öre key (coil 65) is released again in conventional manner. Therefore no registration will take place in the calculating machine. The movement of the arm 47 in horizontal direction, however, is comparatively slow on account of the short-circuited damping coil 55 cooperating with the coil 56. This is necessary to prevent a correction taking place, when a coin of proper weight is inserted, as will be explained later. As soon as the coin 18 has left the weighing beam 17, the various parts resume their initial position, actuated by the counterweight 28 and the spring 27, respectively.

Assuming now that a coin of proper weight is inserted into the same slot 2 for 1-öre coins. At first the contact 42—43 will be closed as before, the coil 65 excited and the 1-öre key pressed down. When the coin 18 thereafter engages the weighing beam, this latter will be pressed down to such an extent that the contact plate 29 touches first the contact 35 and immediately thereafter also the contact 36. By contact 35 the same circuit is closed as before, so that the coil 56 will be excited. At the same time, however, the following circuit is closed: Battery 32, wire 58, coil 66 on the calculating machine for the electric motor key or the key effecting a coupling between the motor and the driving mechanism of the calculating machine, wire 155 (Fig. 4), wire 38, contact 36, contact plate 29, wire 30, wire 31, battery. Thereby the coil 66 will be excited, the calculating machine is set into function and the coin inserted will be registered in the usual manner. As this last named circuit is closed immediately after the other circuit is closed by contact 35 and as the action of the coil 56 is damped by the counter-action of the short-circuited coil 55 and further as the weighing beam 17 is pressed down by the full weight coin to such an extent that the coin falls off the weighing beam and glides into the channel 15 and thence to the money box 16 of the apparatus, the arm 47 will not be moved so much that its contact plate 59 touches the contact 61 and thus effects a correction by exciting the coil 67, inasmuch as the weighing beam 17 immediately upon the coin having left the same will return to its initial position. The circuits are thereby broken at the contacts 35 and 36, so that the excitement of the coil 56 ceases and the arm 47 also returns to its initial position through the intermediary of the parts 48, 49, 21, 26 and the spring 27.

To effect the registration of the inserted coin and the deliverance of a voucher, it is then necessary to pull the handle 12 (Figs. 3, 4 and 11), thereby closing the following circuits: When the contact member 148 reaches the contact 128, the circuit is: Battery, wire 58, coil 93 (Fig. 7) for setting the calculating machine for "printing", wire 153, contact 128, contact 148, wire 152, battery. On the contact member 148 reaching the next contact 129, the circuit is: battery, wire 58, coil 75 on the calculating machine for totalizing the amounts registered in the calculating machine, wire 154, contact 129, contact member 148, wire 152, battery. By the next contact 130 the following circuit is closed: Battery, wire 58, coil 66 for starting the motor of the calculating machine, so that the amount is printed on the voucher 160, wire 155, contact 130, contact member 148, wire 152, battery. Thereafter the contact member 148 touches contact 131 and closes the following circuit: Battery, wire 58, coil 95 for advancing the paper strip 160, wire 156, contact 131, contact member 148, wire 152, battery. Then the contact member 148 touches the contact 132 and closes the following circuit: Battery, wire 58, coil 96 for actuating the cutting means 107, 109, wire 157, contact 132, contact member 148, wire 152, battery. Finally a circuit will be closed by the contact 133, to name: battery, wire 58, coil 94 for setting the calculating machine in "non-print" position, wire 158, contact 133, contact member 148, wire 152, battery 32. When the coil 66 is excited the main shaft of the calculating machine will rotate one revolution only, as is usual in this kind of calculating machines, whereupon the current is interrupted, so that the machine again occupies its initial position. As afore said, the handle 12 must be pulled out its whole length, before it can return to its initial position (Fig. 11), so that the contacts 128—133 must compulsorily come into touch with the contact member 148 and the circuits just mentioned must be thus closed. When the handle 12 at the end of its stroke is released by the operator, the lever 141, 142 will be rocked in counter-clockwise direction, so that the contact member 148 will not touch the contacts 133—128 during the return stroke of the handle 12. The machine is now ready to register the next coin inserted in one of the slots 2—9.

When a Swedish 25-öre coin is inserted into the slot 6, the apparatus will perform in a similar manner as described above, with the exception that instead of the coil 65 for the 1-öre key, the coils 69 and 71 for the 5-öre key and the 20-öre key, respectively, will be excited.

Referring to the apparatus shown in Figures 12-18, parts corresponding to those shown in the preceding figures, are provided with the same reference numerals having a prefix "P". This apparatus is adapted to serve as a postage device, that is to say instead of gumming a postage stamp on the letters, the apparatus will print the amount corresponding to the postage on the letter, when corresponding coins have been inserted into the apparatus and a handle has been pulled out in a similar manner as in the apparatus above described. In the present case there are four handles, one for 5-öre, one for 10-öre, one for 15-öre and one for 25-öre stamp-printings and further a handle for clearing the calculating machine. The apparatus is further provided with a device for paying out that money, which is in excess of the postage to be printed on the letters. The contact arrangements to be operated by the handles are similar to that shown in Fig. 11 and, therefore, have not again been shown in detail for this special apparatus.

The coin chutes P14 may be provided with coin weighing devices as in the preceding example, but for the sake of clearness such devices are not shown. In the present case the coin chutes have associated therewith two separate contact devices, one of which P42, P43 (Fig. 15) corresponds to the contact device 42, 43 in Fig. 4 and the other 161, 162 is for closing the motor circuit. The calculating machine PA in the present case has an arrangement for changing-over the calculating mechanism from addition to subtraction and vice versa from subtraction to addition. This arrangement is actuated by electro-magnets in a similar manner as the device for changing-over from "print" to "non-print", as shown in Fig. 7. It is further to be observed that the change-money to be paid back in the present case is proposed to only consist of 1-öre, 10-öre and 1-crown coins, and for this reason three money containers only are shown. The apparatus, however, may be fitted with any number of such change-money containers with pertaining mechanisms. In order to fill these money containers with coins, the coin chutes P14 associated with the coin slots P2, P5 and P8 adapted for respective 1-öre, 10-öre and 1-crown coins, open direct into said containers, while the other coin chutes open into the money box P16 of the apparatus. For the sake of clearness solely the coin chute P14 for 1-öre coins is shown in Fig. 14.

This apparatus is further provided with a slot for inserting the postal matter to be provided with stamp-printings. Finally a locking arrangement for the handles is attached to the apparatus, for the purpose of locking all other handles, when one handle is pulled.

The paying-out mechanism consists of the following parts (Fig. 16):—About a stud 163 is pivoted a double-armed lever 164, 165, one arm of which forms an armature for an electromagnet 166 which is mounted on the frame 167 of the calculating machine. Between the frame 167 and the arm 164 is fixed a spring 168 which tends to move said lever in clockwise direction, the movement being limited by a stop 169. The arm 164 carries a spindle 170 fixed thereto. About the spindle is rotatable a casing 171 containing a spiral spring, not shown, one end of this spring being fixed to the spindle 170, and the other end being fixed to the casing 171, as is known from clockwork mechanisms. To the casing 171 is fixed a sprocket wheel 172 which carries a stop 173 which abuts against the arm 164, the spring and the casing 171 tending to turn the casing with the sprocket wheel in counter-clockwise direction. The calculating machine is provided in usual manner with printing staves, one of which 174 is shown in Fig. 16 lying opposite to the sprocket wheel. Normally, the printing staves have such position, that they can print the figure 0, when worked upon. Underneath the printing staves is a slot means 175 attached to the front wall P11 of the apparatus. The slot is limited by an upper plate 176 having longitudinal apertures 177 for the printing staves and a lower plate 178, and into this slot the letter 179 to be provided with a stamp printing is to be inserted. A ribbon 180 is inserted in a recess 181 in the upper plate and the ribbon is periodically moved transversely by the usual feeding mechanism, indicated in Fig. 15 as at 182 and 183. Above the sprocket wheel 172 is pivoted, as at 184, a double-armed lever 185, 186. The lower arm 185 supports pivotally two pawls 187 and 188. The movement of the pawl 187 is limited by stops 189 and 190, while the movement of the pawl 188 is limited by stops 190 and 191. The upper end of arm 186 has the form of a fork, surrounding a rod 192 which at the right-hand end extends into a slot 193 of a coin-container 194 which further has an opening 195 at the side opposite to the slot 193. Underneath the coin-container and extending to the right thereof is a coin chute 196 (see also Fig. 14). The rod 192 is provided with a transverse pin 197, and between this pin and the coin-container is inserted a spring 198 under tension, which tends to press the rod 192 and thus the arm 186 to the right in abutment against the bottom of a cylinder 198. The rod 192 carries a piston disk 199 movable within the cylinder 198. The bottom of the cylinder has a larger hole 200, and above this hole is positioned a flap 201 of elastic material, such as leather, the flap having a minute hole 202 arranged substantially coaxially with the hole 200. The cylinder with the piston and the leather flap serves as a brake device, so that the movement of the rod 192 to the right will be comparatively slow, inasmuch as the air contained in the cylinder can only slowly escape through the minute hole 202, while the movement to the left will be comparatively quick, as the air sucked in has free entrance through the larger hole 200, the flap 201 then being sucked away from this hole. The cylinder 198 is integral with a bracket 203 fixed to the coin-container 194 by screw means 204. This coin-paying-out mechanism works in the following manner:—Normally, the parts occupy the position, as shown with full lines. When the calculating machine is operated, the electromagnet 166 will be excited, thereby attracting the arm 165, so that the sprocket wheel 172 is brought into engagement with teeth 205 arranged at the back of the printing stave 174. This position is shown with dotted lines. Thereafter the printing stave is moved to the left corresponding to the amount to be paid back, so that the sprocket wheel 172 will be rotated in clockwise direction the same number of teeth, as the printing stave 174 is moved to the left. Immediately thereafter the electromagnet 166 is demagnetized, the spring 168 drawing the arm 164 back to its initial position. The stop 173 is now away from the arm 164, and therefore the spring in the casing 171 will turn the sprocket wheel 172 in counter clockwise direction, until the stop 173 again abuts the arm 164. During this rotation each of the teeth of the sprocket wheel engages the pawl 187 and thereby swings the lever 185, 186 in clockwise direction about the pivot 184, whereby a coin will be pushed out from the coin-container 194 through the opening 195 into the coin chute 196 and through the latter into the trough P10, from which it may be taken out. This movement is comparatively slow, as above stated. At the end of the stroke of the rod 192, the lever will take up the position shown with dotted lines. In this position the pawl 188 will have come into the path of movement of the next tooth of the sprocket wheel 172, thus stopping the movement of the latter under a shorter period, that is to say, until the arm 186 has again attained the position to the left, shown with full lines, when the stop 190 presses the pawl 188 out of engagement with the sprocket wheel, in which position the pawl 187 will have attained its normal position in abutment with the next tooth of the sprocket wheel. From the above it will be seen, that as many coins are paid out as the sprocket wheel 172 has been rotated the corresponding number of steps, until the stop 173 abuts against the arm 164.

The blocking device for the handle is shown in Figures 12, 17 and 18. Behind the front plate P11 of the apparatus are fixed two guiding members 206 and 207. These guiding members support the ends 208 and 209 of a plate 210 provided with apertures 211, 212, 213, 214 and 215 for the shafts of the handles 216, 217, 218, 219 and P12. The shaft 220 has on its left hand side a projection 221 and on its right hand side a recess 222 with an inclined surface 223. The aperture 211 has the same width as the shaft 220, or as this shaft at that portion thereof, which includes the projection 221 and the bottom of the recess 222. The plate 210 is actuated by a spring 224, attached to the plate and also to a bracket 225, fixed to the front plate P11, a stop 226 being also fixed to the front plate to limit the movement of the plate 210 to the left. The front plate has corresponding apertures 227 which have the same width as the sum of the widths of the shaft 220 and the length of the projection 221, as will be seen in Fig. 18. When a handle, for instance 216, is pulled out, the inclined surface 223 will push the plate 210 to the right, whereby the projections 221 on the other handle shafts will be behind the plate 210, so that the same cannot be pulled out.

The handles are associated with a contact device similar to that shown in Fig. 11, the only difference being that a fewer number of contacts exist in the present case. Each handle shaft supports a contact member 216a, 217a, 218a, 219a and P12a, respectively. The contact member 216a cooperates with contacts 228, 229, 230, 231. The contact member 217a cooperates with contacts 228a, 232, 230a, 231a. The contact member 218a cooperates with contacts 228b, 232a, 229a, 230b and 231b. The contact member 219a cooperates with contacts 228c, 233, 230c and 231c. The contact member P12a cooperates with contacts 234, 235, 236, 237, 231d. The contact 237 extends also parallelly to the contact 231d, but is insulated from the latter. The contact 237 is adapted to close the circuit for the electromagnet 166 (Fig. 16), and the contact 231d shall close the circuit for the motor of the calculating machine PA, whereby the printing stave 174 (Fig. 16) is moved to the left, and obviously the electromagnet 166 must be kept excited during said movement of the printing stave. This is the reason why contact 237 cooperates with the contact member P12a, as long as the latter cooperates with the contact 231d.

The apparatus works in the following manner:—Assuming that the postage amounts to 15 öre and the operator inserts a 25-öre coin into slot P6. He inserts the letter to be stamped into the slot 175. The coin falling through the slot P14 engages first the contact device P42, P43, closing the following circuit:—Battery P32, wire P58, coil P81, contact P43, contact plate P42, wire P31 and battery. The coil P81 will be excited, thereby attracting the arm P83 closing the contacts P85, P88 and P89, whereby the following circuits are closed:—Battery P32, wire P58, coil P71 for the 20-öre key on the calculating machine, wire P89a, contact P89, contact plate P85, wire P86, wire P31, battery, and simultaneously battery, wire P58, coil P69 for the 5-öre key on the calculating machine, wire P91, wire P90, contact P88, contact plate P85, wire P86, wire P31 and battery. The two keys for 20-öre and 5-öre are thus pressed down. On the coin reaching the contact device 161, 162 the following circuit is closed:—Battery P32, wire P58, coil P66 for starting the motor of the calculating machine and thus registering the amount 25-öre, wire P155, wire 162a, contact 162, contact plate 161, wire P31 and battery. By the action of the motor the pressed down keys return to their initial, i. e. lifted up position. The coin falls down into the money box P16, Fig. 14. Thereupon the operator pulls the handle 218 adapted for 15-öre stampings. The contact member 218a engages the various contacts, thereby closing the following circuits:—(1) Battery P32, wire P58, coil P93a for setting the calculating machine for subtracting operations, wire 238, contact 228b, contact member 218a, wire P152 and battery; (2) battery P32, wire P58, coil P70 for the 10-öre key of the calculating machine, wire 70a, contact 232a, contact member 218a, wire P152 and battery; (3) battery P32, wire P58, coil P69 for the 5-öre key, wire P91, wire P90a, contact 229a, contact member 218a, wire P152 and battery; (4) battery P32, wire P58, coil P93 for setting the calculating machine into "print" position, wire P153, contact 230b, contact member 218a, wire P152 and battery; (5) battery P32, wire P58, coil P66 for the motor of the calculating machine, wire P155, contact 231b, contact member 218a, wire P152 and battery. The amount 15 öre has now been deducted from the amount 25 öre, so that there will be a rest of 10 öre. At the same time the printing staves have printed 15 öre on the letter. The handle 218 is then released by the operator, and instead thereof the handle P12 is pulled to clear the machine. By the contact member P12a on the handle P12 the following circuits are closed:—(1) battery P32, wire P58, coil P94a for setting the calculating machine for adding operations, wire 239, contact 234, contact member P12a, wire P152 and battery; (2) battery P32, wire 58, coil P94 for setting the calculating machine into "non-print" position, wire P158, contact 235, contact member P12a, wire P152 and battery; (3) battery P32, wire P58, coil P75 for obtaining a total of the amounts registered, that is to say 25 öre minus 15 öre=10 öre, wire P154 contact 236, contact member P12a, wire P152 and battery; (4) battery P32, wire P58, coils 166 for operating the paying-out mechanism, shown in Fig. 16, wire 166a, contact 237, contact member P12a, wire P152, and battery; (5) battery P32, wire P58, coil P66 for starting the motor, wire P155, contact 231d, contact member P12a, wire P152 and battery. When this last named circuit is closed, the circuit number 4 closed by the contact 237 is still existing, as explained above. The printing stave 174 will in this case not print any amount, but will be moved to the left (Fig. 16) one step, so that one 10-öre coin will be discharged from the coin container 194 and passes through the coin chute 196 into the trough P10, from which it may be taken out.

The apparatus, shown in Figs. 19–25, is adapted for cash control purposes and thus substitutes the usual cash control apparatus. Instead of the calculating mechanisms usually employed in such cash control apparatus, a calculating machine of the type above referred to, is utilized in the present case. In addition to the keys and mechanisms described in connection with the two types of apparatus described above, the present apparatus makes also use of the sub-total key 242, and further the apparatus is provided with coin slots for 5-crown and 10-crown coins, 240 and 241, respectively. Further, the slots in this case are arranged in reversed order, that is to say the 1-öre coin slot C2 is on the right hand side of the apparatus. This cash control apparatus is adapted to be operated by the shop assistant only. The apparatus is provided with a handle C12 to be operated by the shop assistant, and with a further contact arrangement C12a, which is operated automatically. This latter contact arrangement acts in reversed order, as that shown in Fig. 11, that is to say the contact member C148 is arranged on the right hand side, so that circuits will be closed on the return stroke of the rod carrying the contact member C148. The keys of the calculating machine are arranged to be operated electrically by electromagnets C65 similar to that shown in Fig. 5, and also to be operated manually. The keys are further adapted to operate a special contact device, shown in Figs. 21–23.

The contact arrangement C12a will now be described more fully.

An electromagnet 243 is attached to a bracket 244 fixed to the frame of the apparatus. A core 245 extends with its one end into the interior of the electromagnet 243. The core is integral with a rod 246 having an extension 247 of less diameter. This extension is slidable in an opening of a wall 248. A plate 249 is threaded upon the rod 246 in abutment against the core 245 and is kept in this position by means of a pin 250 traversing the rod 246. Between the plate 249 and the wall 248, two springs 251 and 252 are mounted, tending to move the rod system 245, 246, 247 to the right, a shoulder 253 abutting against the wall 248 limiting the movement of this rod system to the right. The rod 246 carries the pivoted lever C141 actuated by springs C143, C144. The lever carries the contact member C148 which glides on a contact rod C136 connected to the minus pole of the battery by a wire C152. A bracket 254 fixed to the bracket 244, carries a bar 255 of insulating material, and this bar supports also the contact rod C136. In the bar 255 are inserted contact members C130, C234, C129, C237, C130a, C133, C131, C132. In order that the rod system 245, 246, 247 shall return slowly to its initial position, as shown in Fig. 24, the rod 246 has attached thereto a rack 256 in engagement with the toothed wheel 257 rotatable on a spindle 258. To this spindle is fixed a ratchet wheel 259, and to the toothed wheel 257 is pivoted a spring-actuated pawl 260. The spindle 258 supports a governor device 261. When the rod system is moved to the left, the toothed wheel will rotate about the spindle 258, the pawl gliding over the teeth of the ratchet wheel 259. When the rod system returns to its initial position, the pawl 260 engages one of the teeth of the ratchet wheel 259 and thereby rotates the spindle 258 with the governor device 261, so that by this means a breaking action is obtained and the rod system returns slowly to its initial position, influenced by the springs 251 and 252. During this return stroke the contact member C148 engages the contacts inserted in the bar 255 one after the other, and thereby closes various circuits, as will be explained later.

The electromagnet which actuates the numeral keys of the calculating machine, is constructed similarly to that shown in Fig. 5. Freely abutting the upper surface of each core C79 of the units column is in this case, however, a spindle 262 provided at its upper end with a knob 263. Underneath the knob is a washer 264 and between the washer and the top plate 265 of the calculating machine is inserted a spring 266 under tension. Extending longitudinally underneath the washers 264 of the numeral key mechanism of the units column is a plate 267 pivoted at 268 and 269. This plate has a lateral extension 270 with a knob 271. The washer 264 is of such a diameter, that it will engage the right hand edge of the plate 267, when the knob 263 is pressed down manually. Between the extension 270 and the top plate 265 of the calculating apparatus is inserted a spring 273, and on the other side of the pivot 268 is a stop 274 limiting the movement of the plate in one direction. To the left hand side portion of the plate 267 is fixed a contact member 275, and on a bracket 276 fixed to the top plate 265 of the apparatus, is a corresponding contact member 277. The contact member 275 is connected by a wire 278 with the positive pole of the battery C32, and the contact member 277 is connected by a wire 279 to the winding of the electromagnet 243, the other end of this winding being connected by a wire 280 with the negative pole of the battery C32. It is to be understood, that the contact members 275 and 277 are insulated from the parts supporting the same. When the plate 267 is operated either automatically by the depression of a knob 263 in the event that a figure has been registered in the units column or manually by means of the knob 271 in the event that no figure was registered in the units column, the contact members 275 and 277 touch each other, thereby closing a circuit for the electromagnet 243 which attracts the core 245, so that the contact member C148 will move to its left hand end position. When the circuit is again interrupted at the contact members 275 and 277, the electromagnet 243 will be demagnetized and the rod system 245–247 returns to the right hand end position. During this movement the contact member C148 engages the various contact members C130, C234 and so on.

This apparatus operates in the following manner:—Assuming that an article is bought to the value of 73 öre and that the customer has paid 75 öre by means of one 50-öre coin, two 10-öre coins and one 5-öre coin, the shop assistant inserts these coins into the pertaining slots in any order whatsoever. If he first inserts the 50-öre coin into the slot C7, the coin operates first the contact device C42, C43 within the coin chute C14, thereby closing the following circuit:—Battery C32, wire C58, coil C72 for the 50-öre key, wire C45a, contact C43, contact C42, wire C31, battery. Thereafter the coin operates the contact device C161, C162, thereby closing the following circuit:—Battery C32, wire C58, coil C66, for starting the motor of the calculating machine, whereby 50 öre is registered and the key operated by the coil C72 is released, wire C162a, contact C162, contact plate C161, wire C31 and battery. Thereafter a 10-öre coin is inserted into the slot C5. In a similar manner as before, the contact device C42, C43 will close the aforesaid circuit, but this time the coil C70 for the 10-öre key of the calculating machine will be excited instead of the coil C72. Thereafter the contact device C161, C162 will close the circuit for the motor as before. When the shop assistant thereafter inserts the second 10-öre coin, the same procedure will take place. Finally, the 5-öre coin is inserted into the slot C4, whereby the coil C69 for the 5-öre key is excited. The calculating machine has thus registered together 75 öre. The shop assistant then operates the handle C12, whereby the following circuits will be closed:—(1) Battery C32, wire C58, coil 242 for obtaining a sub-total in the calculating machine, wire 242b, contact 242a, contact member C148a, wire C152, battery; (2) battery C32, wire C58, coil C93 for setting the calculating machine to "print" position, wire C153, contact C128, contact member 148a, wire C152, battery; (3) battery C32, wire C58, coil C66, wire C155, contact C130b, contact member C148a, wire C152, battery; (4) battery C32, wire C58, coil C93a, wire C238, contact C228, contact member C148a, wire C152 and battery. When circuit number 3 is closed, the sub-total will be printed on the voucher, that is to say 75 öre and by closing circuit number 4, the calculating machine is set for subtracting operation. The shop assistant now operates manually the keys corresponding to the sale price of the article, that is to say he presses down the key 281 for 70 öre and also the key 282 for 3 öre. When this key 282 is pressed down the contact device 275, 277 will be closed and thereby the circuit for the electromagnet 243 as follows:—Battery C32, wire C58, wire 278, contact 275, contact 277, wire 279, electromagnet 243, wire 280, wire C152 and battery. Immediately after the electromagnet has attracted the rod system 245—247 and the operator has released the key 282, the rod system is returned by the springs 251, 252 to the initial position, as shown in Fig. 24, whereby the contact member C148 will close the following circuits:—(1) Battery C32, wire C58, coil C66 for starting the motor of the calculating machine, whereby the amount 73 is printed on the voucher and registered in the machine, that is to say as subtracted from the previous amount 75 öre, wire C155, contact C130, contact member C148, wire C152, battery; (2) battery C32, wire C58, coil C94a for setting the calculating machine for adding operations, wire C239, contact C234, contact member C148, wire C152 and battery; (3) battery C32, wire C58, coil C75 for totalizing the calculating machine, wire C154, contact C129, contact member C148, wire C152 and battery; (4) battery C32, wire C58, coils C166 for operating the paying-out mechanism, as shown in Fig. 16 and described above, wire C166a, contact C237, contact member C148, wire C152 and battery; (5) battery C32, wire C58, coil C66 for the motor of the machine, whereby the printing stave 174 is moved two steps to the left (Fig. 16) and the sprocket wheel 172 is also rotated two steps and further the rest amount 2 öre is printed on the voucher, contact C130a, contact C148, wire C152 and battery; (6) battery C32, wire C58, coil C94 for setting the calculating machine into "non-print" position, wire C158, contact C133, contact member C148, wire C152 and battery; (7) battery C32, wire C58, coil C95 for feeding the paper strip, wire C156, contact C131, contact member C148, wire C152, and battery; (8) battery C32, wire C58, coil C96 for operating the knife, wire C157, contact C132, contact member C148, wire C152 and battery.

When circuit number 5 is closed, the circuit number 4 is also kept closed, as explained in connection with Fig. 15, inasmuch as the sprocket wheel 172 must be kept in engagement with the teeth 285 of the printing stave 174, when this moves to the left. The rest amount two 1-öre coins are paid out, which will leave the apparatus through the coin chute C196 and fall into the trough C10, from which the same may be taken out. At the same time the calculating machine is cleared. When the voucher is severed from the paper strip by the knife C107, 109, the voucher falls onto the upper outer side of the chute C196 and glides down also into the trough C10, from which it may be taken out.

The apparatus shown in Figs. 26–30 is adapted for printing and selling tickets for theatres and the like. In general it may be said that the chief parts are similar to those shown in the preceding figures, especially those shown in Figs. 19–25. Parts which previously have been shown are, therefore, marked with the same reference numeral, a prefix T being added. The present apparatus differs from the preceding apparatus in that it is provided with a great number of keys, for instance 989, as shown in Fig. 26, corresponding to the number of seats in a theatre. Further the apparatus is provided with special relays, such as 308—315, as shown in Fig. 29. The apparatus is provided with ten coin slots T2—T9, T240, T241 and in addition with two slots 283, 284 for bank notes, for instance for 50-crown and 100-crown notes. The manner in which these coin slots for notes operate will be described later in connection with Figure 42.

Each key 286 consists of a rod T13 which may be displaced longitudinally through openings T11a and 302a in the front wall T11 and an intermediate wall 302, respectively, of the casing T1 (see Fig. 28). Between the wall T11 and the knob 286 a spring 287 is inserted, surrounding that part of the rod T13, which projects from the front wall T11. This spring 287 tends to pull the rod T13 outwardly, and to limit this movement a pin 288 passes through the rod T13 and abuts against the internal surface of the front wall T11. The rod is provided with a recess 289 cooperating, when the key is pushed inwardly, with a hook 293. This hook is loosely journalled on a spindle 292 which is journalled in brackets 292a, one of which only is shown. On the spindle is journalled a chain wheel 294 provided with a pin 295 adapted to lift the hook 293, when the wheel 294 is rotated in counterclockwise direction. This chain wheel and all the other chain wheels in the same vertical row are interconnected by an endless chain 294a engaging the same on two opposite points. The lower end of this chain is led round a chain wheel 296a fixed to a spindle 296, to which is secured a double-armed lever 297, 298, the arm 298 being provided with a crank 298a accessible from the outside. A spring 301 is fixed with one end to the arm 298 and with the other end to the wall 302, the spring tending to rotate the lever in clockwise direction. A stop 300 is fixed to the wall 302 and limits the movement of the lever in clockwise direction. Another stop 299 is fixed to the wall 302 and limits the movement of the lever, at the arm 297, in counterclockwise direction, when the operator rotates the lever by means of the crank 298a. When a key 286 is pushed inwardly, the hook 293 will fall down by its own weight into the notch 289, thereby locking the key. When all tickets are sold or if no more tickets are to be sold, for instance, when the performance has already begun and the keys are to be released, so that they assume their initial position, the operator rocks the lever 297, 298 in counter-clockwise direction, whereby, through the intermediary of the spindle 296, to which all chain wheels 296a at the bottom of all vertical rows are fixed, and by means of the chains 294a, the chain wheels 294 will also be rotated in clockwise direction, whereby the pin 295 lifts the hooks 293, so that the latter will be disengaged from the notches 289 on the rods T13 and the latter is pressed forward by means of the spring 287, until the pin 288 abuts the front wall T11.

Each rod is provided, as in the preceding example, with a pivoted double-armed lever T141, T142 which is kept in substantially vertical position by means of springs T143, T144. The upper arm T142 is provided with a contact plate T148 which is insulated from the arm by means of the insulation T147. The contact plate is adapted to contact with a rail T136 mounted on a bridge piece T127 and connected by a wire T152 with the minus pole of the battery T32. The bridge piece is provided with arcuated recesses T150 and T151 located at the two end positions of the rod T13, that is to say at the end positions of the contact plate T148. The bridge piece supports further contact bars 303, 305, 306, 319, 321, 323 and 337. These contact bars are connected by wires with various electromagnets, as will be explained presently. The bridge piece is further provided on its underneath side with notches T149 located between each pair of the contact bars, these notches serving as abutment to prevent the rod T13 to return to one of its end positions, before the double-arm lever T141, T142 has been rocked about its pivot T140 in one of the recesses T150 or T151. When the key 286 is pushed in, the contact plate T148 contacts with all the contact bars one after the other, and when the key 286 is released, as above described, it will be rocked in clockwise direction by abutting against the left side edge of the recess T151, so that the contact plate T148 does not contact with the contact bars on the return stroke of the rod T13.

As will be seen from Fig. 26, there are 32 horizontal rows of keys 286, the upper 31 rows containing 32 keys each, whilst the last row contains seven keys only, that is to say the apparatus is adapted for 999 places in a theatre. It is now assumed, that the theatre issues tickets at three different prices, for instance places 1–100 at a price of 5.50 crowns each, the places 101–700 at a price of 2.45 crowns each, and the places 701–999 at a price of 1.10 crowns each. For each group of prices there is provided a so-called price-relay 325, 325a and 325b (see Fig. 30). In addition, a special relay is provided for each place in the theatre, one of such relays being shown in Fig. 29.

The calculating machine TA is of the same kind as in the previous examples, but in this case also the "non-adding" key is made use of, and further all keys of the calculating machine for registering the prices of the tickets and also for enabling to print the place number on the ticket, are provided with electromagnets of the kind as shown in Fig. 5. The calculating apparatus in this case is provided with four money containers for change money, one being filled with 1-öre coins, the second with 10-öre coins, the third with 1-crown coins, and the fourth with 10-crown coins. The apparatus is further provided with an automatic contacting device of the same kind as shown in Fig. 24.

As otherwise the parts of this apparatus are of the same kind as in the previous examples, a detail description of the same is superfluous, and the working of the apparatus will now be described.

Assuming that a customer wishes to obtain a ticket for the place number 112 at a price of 2.45 crowns and he has at his disposal a two-crown coin and a 50-öre coin, so that he obtains, when operating the apparatus, a ticket stating the number of the place and the price of the same and further 5-öre as change money. He inserts first the two-crown piece into the slot T9, whereby the contact spring T42 will contact the fixed contact T43, thereby closing the following circuit: Battery T32, wire T58, coil T74 for the two-crown key on the calculating apparatus TA, wire T43a, contact T43, contact T42, wire T31 and battery. The key T74 is thus pressed down. Thereafter the coin presses the contact spring T161 against the fixed contact T162, thereby closing the following circuit: Battery T32, wire T58, coil T66 for starting the motor of the calculating machine, wire T161a, contact T162, contact T161, wire T31 and battery. When the motor is started or, as the case may be, the motor is coupled to the operating mechanism of the calculating machine, the inserted 2-crowns will be registered in the counters of the calculating machine. Thereafter the customer inserts the 50-öre coin into the slot T7, thereby closing first the circuit: Battery T32, wire T58, coil T72 for the 50-öre key on the calculating machine, wire 43a', contact T43', contact T42', wire T31 and battery, and secondly the circuit: Battery, wire T58, coil T66, for starting the motor, wire T161a, contact T162', contact T161', wire T31 and battery. By this means also the 50-öre coin will be registered. Thereafter the customer pushes inwardly the key 285 (Fig. 26) corresponding to the place number 112 in the theatre. The contact plate T148 then contacts the various contact bars shown in Figs. 28 and 30. Contact bar 303 is connected by wire 303a with the coil 304 for setting the calculating machine for "non-adding" operation. Contact bar 305 is connected by wire T153 with coil T93 for setting the calculating machine for "printing" operation. The short individual contact bar 306 is connected by wire 307 with the coil 308 attracting the arm 309 which is provided with the contact plate 311 and normally is held away from the coil 308 by means of the spring 310 (see Fig. 30). Opposite to the contact plate 311 which by wire 312 is connected with the negative pole of the battery T32, are three contact members 313, 314 and 315. Contact member 313 is connected by wire 316 with the coil T68 for the key number 2 in the unit row. Contact member 314 is connected by wire 317 with coil T70 for key number 1 in the tens-row, and contact member 315 is connected by wire 318 with coil T73 for key number 1 in the hundreds-row. The keys for the place number 112 are thus pressed down, and as the machine is set for "non-adding" and "printing" operation, the number 112 will not be registered in the machine, but will be printed on the ticket. Contact bar 319 is connected by wires 320 and 350 with coil T66 for starting the motor, whereby the number 112 is printed on the voucher, the keys for this number 112 are released and also the key for "non-adding" operation is released. Contact bar 321 is connected by wire 322 with coil T93a for setting the calculating machine for subtracting operation. Contact bar 323 which only extends over the same group of keys, places 101—700, which belong to the same class of price, is connected by wire 324 with the coil 325a attracting an arm 326 having a contact plate 327 and being held away from the coil by means of a spring 320a. The contact plate 327 is connected by means of a wire 328 with the negative pole of the battery. Opposite to the contact plate 327 are three contact members 329, 330 and 331. Contact member 329 is connected by wire 332 with coils 335 for the 5-öre key on the calculating machine. Contact member 330 is connected by wire 333 with the coil 336 for the 40-öre key on the calculating machine and contact member 331 is connected by wire 334 with coil T74 for the 2-crown key on the calculating machine. Finally, the contact bar 337 is connected by wire 338 with a coil 339 for actuating an automatic contact device, the other end of the coil being connected by wire 340 to the positive pole of the battery T32. When the coil 339 is energized, the rod T246 will be drawn to the right in Fig. 29 or up in Fig. 30. As soon as the contact plate T148 has left the bar 337, the coil is again demagnetized and the spring T251 draws the rod T246 in opposite direction, whereby the contact plate T148 will contact the various contact pins on the bridge piece T255, whereby the following circuits will be closed:—(1) Contact pin 341, wire 350, coil T66 for the motor, whereby the amount 2.45 crowns is registered, printed on the voucher and subtracted from the originally inserted amount 2.50 crowns leaving a rest of 5 öre. (2) Contact pin 342, wire 351, coil T94 for setting the calculating machine for "non-printing" operation. (3) Contact pin 343, wire 353a, coil T75 for setting the calculating machine for totalizing operation. (4) Contact pin 344, wire 352, coils T166 for engaging the sprocket wheel with the printing stave as shown in Fig. 16 and described above. (5) Contact pin 345, wire 350, coil T66 for starting the motor, whereby the printing stave is pushed forward 5 teeth corresponding to the 5-öre to be paid back. These five 1-öre coins pass through the channel 358 into the trough T10, from which they may be taken out. (6) Contact pin 346, wire 353, coil T95 for feeding the paper strip. (7) contact pin 347, wire 354, coil T96 for operating the knife mechanism. (8) Contact pin 348, wire 355, coil T94a for setting the calculating machine again for "adding" operation. The apparatus is now clear for the next operation. After the voucher has been cut off, it glides through the channel T159 into the trough T10, from which it may be taken out. From the above it will be seen, that the calculating machine is utilized for registering the amount paid in, for registering the price of the ticket, for registering the difference, for printing the amounts on the voucher and also for printing the number of the place on the ticket. The channels T14 may of course be provided with a weighing mechanism of the same kind as shown in Figs. 3 and 6.

The apparatus shown in Figs. 31–35 is similar to the apparatus above described, the difference being that the same is provided with one or only a few special operating members instead of the 999 keys. This apparatus is specially intended for use on omnibuses, tramways, railways or the like vehicles and adapted to be operated by the conductor of said vehicles. Parts corresponding to those utilized in the apparatus above described, are marked with the same reference numerals, a prefix B being added.

The operating means shown in Fig. 35 is a simple contacting device. Attached to the front plate B11 of the casing are two brackets 359 and 360 which with their free ends support a plate 361. To the front plate B11 is further attached a U-shaped bracket 362 with a central opening 363 in axial alignment with a hole 364 in the front wall B11. Through these holes extends a pin 365 with a knob 366. A spring 367 is inserted under tension between the knob 366 and the front wall B11. To limit the movement of the pin outwardly a smaller pin 368 traverses the pin 365 and abuts against the U-shaped bracket 362. The free end of the pin 365 engages a contact spring 369 attached to the internal wall 361 and connected by a wire 370 to the negative pole of the battery B32. Opposite to the pin and at a certain distance from the contact spring is a fixed contact member 371. This contact member extends through the plate 361 which preferably is made of insulating material, but it is to be understood, that this plate also may be made of metal, in which case the contact member must be insulated, in appropriate manner. The contact member 371 has attached thereto a wire 372 leading to a coil B243 for actuating an automatic contact device, as will be explained later. The apparatus is provided with coin slots B2—B9 intended for respectively 1-öre, 2-öre, 5-öre, 10-öre, 25-öre, 50-öre, 1-crown and 2-crown coins. The chief parts of this apparatus are in other respects the same as employed in the apparatus previously described. Only the automatic contact device has a greater number of contacts than the other apparatus. This apparatus will now be described in connection with an explanation of the working of the same. Assuming that the apparatus is adapted to sell tickets of the value of 15 öre only. If now a 1-crown piece is inserted into the coin-slot B8, which means that the passenger shou'd receive 85 öre in change together with the ticket, the coin first operates the contact device B42, B43 closing the following circuit: Battery B32, wire B58, coil B73 for the 1-crown key on the calculating machine BA, wire B43', contact B43, contact B42, wire B31 and battery. Thereafter the coin operates the contact device B161, B162 closing the following circuit: Battery, wire B58, coil B66 for starting the motor of the calculating machine, wire B161a, contact B162, contact B161, wire B31 and battery. The amount 1-crown is registered in the machine and the 1-crown key is again released. Thereafter the conductor presses the knob 366 inwardly, thereby closing the following circuit: battery, wire B58, coil B243, wire 372, contact 371, contact 369, wire 370 and battery. The coil B233 being excited, the rod B246 is drawn to the right in Fig. 33 or upwardly in Fig. 34, so that the contact member B148 is also moved to the right in Fig. 33. The contact member B148 does not, however, during the forward stroke of the rod B246 touch the contact pins on the bridge piece B255, as previously explained in connection with Fig. 29. When the conductor releases the knob 366, the rod B246 is moved to the left by the spring B251, and in this case the contact member B148 closes the following circuits one after another, it being understood that the contact member B148 is connected by wire B152 with the negative pole of the battery B32 and that the coils mentioned in the following are connected by wire B58 with the positive pole of the battery: (1) contact pin 373, wire 374, coil B94a, for setting the calculating machine for subtracting operation; (2) contact pin 375, wire 376, coil B70 for the 10-öre key on the calculating machine; (3) contact pin 377, wire 378, coil B69 for the 5-öre key on the calculating machine; (4) contact pin 379, wire 380, coil B93 for setting the machine for "printing" operation; (5) contact pin 381, wire 382, coil B66 for starting the motor, whereby the amount 15 öre will be registered, printed on the voucher and subtracted from the originally inserted 1-crown; (6) contact pin 383, wire 384, coil B75 for setting the calculating machine for totalizing, showing a rest of 85 öre; (7) contact pin 385, wire 386, coil B94 for setting the calculating machine for "non-printing" position; (8) contact pin 387, wire 388, coils B166 for operating the paying-out mechanism; (9) contact pin 389, wire 382, coil B66 for starting the motor, whereby the printing stave corresponding to 80 öre and the printing stave corresponding to 5 öre will be moved eight and five teeth, respectively, as explained above in connection with Fig. 16. From the money containers B194 will be paid out five 1-öre coins and eight 10-öre coins which pass through the channel B358 into the trough B10, from which the same may be taken out; (10) contact pin 391, wire 392, coil B95 for feeding the paper strip; (11) contact pin 393, wire 394, coil B96 for cutting the paper strip; (12) contact pin 395, wire 396, coil B93a for setting the calculating machine again for adding operation. The ticket cut-off will fall down into the trough B10, from which it may be taken out.

The apparatus shown in Figs. 36-41 is adapted for selling goods, such as, for instance, cigarettes or other articles. The chief parts of this apparatus are similar to those utilized in the apparatus above described, and therefore corresponding parts are provided with the same reference numerals, a prefix G being added. This apparatus is provided with three drawers G12, G12a and G12b, but it is to be understood that a greater or less number of drawers may be fitted to the apparatus. The apparatus is further provided with push-buttons G286, G286a and G286b, one for each drawer. Above the drawers are arranged stacks of goods 364 which may be seen through windows 361, 362 and 363. The apparatus is provided with coin slots G2—G9, G240 and G241 for Swedish 1-öre, 2-öre, 5-öre, 10-öre, 25-öre, 50-öre, 1-crown, 2-crown, 5-crown and 10-crown coins, respectively. Each drawer, for instance G12 (see Fig. 40), consists of a container 366 with a front wall 367, a bottom 368, two side walls 366a and 366b, a back wall 369 and a horizontal extension 370 attached to the back wall and on which the stack of goods rests, when the drawer is pushed or drawn outwardly. The drawer is arranged to slide on a bracket 365 fixed to the front wall G11 by means of screws 368a. This bracket has an upright extension 373 with a horizontal opening 372, through which extends a rod 371 fixed to the back wall 369 of the drawer. Between this back wall and the upright extension 373 is inserted a spring 374 under tension, which tends to press the drawer 366 outwardly. The rod 371 is provided with a chamfered notch 384 which engages with the chamfered end 383 of a pin 382 extending vertically through the extension 373. This pin 382 is integral with a core 377 of an electromagnet 378, the winding of which is connected by wires 379 and G152a with other parts of the apparatus, as will be explained later. The electromagnet is mounted on a casing 376 which in its turn is fixed to a flange 375 integral with the upright extension 373. The core 377 is provided with a flange 380, and between this flange and the upper wall of the casing 376 is inserted a spring 381, tending to press the core 377 and thereby the pin 382 downwardly. Obviously, when the electromagnet 378 is energized, the core 377 will be attracted against the action of the spring 381, so that the pin 382 will be disengaged from the notch 384 in the rod 371. The rod and thereby the drawer G12 with the container 366 and the goods therein will be pushed outwardly by the action of the spring 374.

The push buttons G286, G286a and G286b are of similar construction as the key 286 shown in Fig. 28. Further the relay G308—G315 is of similar construction as the relay 308—315 shown in Fig. 29. The relay is adapted to register the price of the goods to be purchased. In the illustrated example the goods shown in the window 361 are supposed to cost 50 öre each, the goods shown in the window 362 one crown each and the goods shown in the window 363 1.75 crowns each. For this reason it will be understood that the push-buttons G286 and G286a need not be combined with special relays, as the prices 50 öre and 1 crown may be registered directly, while the price 1.75 crowns cannot be registered directly, but requires the said relay device. The push buttons are adapted to co-operate with contact bars in a similar manner as the key 286 shown in Fig. 28.

The function of this apparatus will be explained by an example. Assuming that the purchaser wishes to obtain a packet of the goods shown in the window 363 at the price of 1.75 crowns and he has at his disposal a 1-crown, a 50-öre and a 25-öre coin. If he inserts these coins in named order, the 1-crown coin is to be inserted into the slot G8. The coin operates first the contact arrangement G42 and G43, thereby closing the following circuit:— Battery G32, wire G58, coil G73 for the 1-crown key on the calculating machine GA, wire G45, contact G43, contact G42, wire G31 and battery. Thereafter the coin operates the contact device G161, G162, thereby closing the following circuit:—Battery G32, wire G58, coil G66 for starting the motor, wire G155a, contact G162, contact G161, wire G31 and battery. Hereby one crown will be registered in the calculating machine and the 1-crown key operated by the coil G73 will be released. The 50-öre coin is then inserted into the slot G7, operating first the contact device G42a, G43a, whereby the following circuit is closed:—Battery G32, wire G58, coil G72 for the 50-öre key on the calculating machine GA, wire G45a, contact G43a, contact G42a, wire G31 and battery. The coin closes there next the following circuit:—Battery G32, wire G58, coil G66 for starting the motor, wire G155a, contact G162a, contact G161a, wire G31 and battery. Finally the 25-öre coin is inserted into the slot G6 thereby closing the following circuit:—Battery G32, wire G58, coil G81, contact G43b, contact G42b, wire G31 and battery. The coil G81 is energized and attracts the arm G83, thereby closing the following two circuits:—
(1) Battery G32, wire G58, coil G69 for the 5-öre key on the calculating machine, wire G88a, contact G88, wire G86 and battery; (2) Battery G32, wire G58, coil G71 for the 20-öre key on the calculating machine, wire G89a, contact G89, contact G85, wire G86 and battery. Finally, the 25-öre coin closes the following circuit:—Battery G32, wire G58, coil G66 for starting the motor of the calculating machine, wire G155a, contact G162b, contact G161b, wire G31 and battery. The amount 1.75 crowns has now been registered in the machine and the respective keys have been released and returned to their initial positions. Thereafter the purchaser presses the button G286b inwardly, whereby the following seven circuits are closed:—(1) Battery G32, wire G58, coil G93a for setting the calculating machine for "subtraction"-operation, wire G238, contact bar 303, contact on the push-button G286b, wire G152 and battery; (2) Battery G32, wire G58, coil G308, the short individual contact bar G306, push button G286b, wire G152 and battery. The coil G308 will be energized attracting the arm G309 with the contact member G311, thereby closing the following sub-circuits:—(a) Battery G32, wire G58, coil G69 for the 5-öre key on the calculating machine, wire G45b', contact G313, contact G311, wire G312 and battery; (b) Battery G32, wire G58, coil 386 for the 70-öre key on the calculating machine, wire 385, contact G314, contact G311, wire G312 and battery; and (c) Battery G32, wire G58, coil G73 for the 1-crown key on the calculating machine, wire 387, contact G315, contact G311, wire G312 and battery. The amount 1.75 is now registered in the machine, but as a post to be subtracted from the amount inserted; (3) Battery G32, wire G58, coils G166 for the paying out mechanism, wire G352, contact bar G305, push-button G286b, wire G152 and battery; (4) Battery G32, wire G58, coil G75 for obtaining the total in the calculating machine, wire G154, contact bar G321, push-button G286b, wire G152, and battery; (5) Battery G32, wire G58, coil G66 for starting the motor of the calculating machine, wire G155, contact bar G323, push-button G286b, wire G152 and battery. As the amount inserted is equal to the price of the goods to be purchased, there will be no difference, and consequently no change money will be paid out, that is to say that printing staves as shown in Fig. 16 will not be pushed forwardly, so that the paying-out mechanism will not be operated; (6) Battery G32, wire G58, coil G94a for setting the calculating machine for "adding"-operation, wire G239, contact bar G337, push-button G286b, wire G152; (7) Battery G32, wire G58, wire G152a, coil G378 for releasing the drawer containing the goods, wire 379, the short individual contact bar 390, push button G286b, wire G152 and battery. Upon the drawer having been pushed outwardly, the customer releases the push button G286b which by means of a spring (compare spring 287 in Fig. 28) will return to its initial position. The drawer is thereafter pushed in manually. It is of course to be understood that the drawer may be adapted to be drawn inwardly automatically, for instance, by means of a spring, in which case the drawer is to be drawn out manually, as it is quite usual in similar automatic apparatus. From the description of the above described apparatus it will be clear, that the apparatus shown in Figs. 36–41 is also capable of receiving coins which do not agree with the purchase price, in which case the change will be paid out, as explained before.

On the inside of the front wall of the casing a blocking bar 500 is fitted, which is shaped and acts in a similar manner as the plate 210 shown in Figs. 12 and 17, and for this reason the bar 500 has not been shown in detail.

As pointed out above the apparatus shown in Figs. 26–30 is provided with slots 283 and 284, for bank notes, and it is to be understood that, if necessary, also the other apparatus above described may be provided with similar slots and the mechanisms pertaining thereto. The details of these mechanisms will now be described more fully. Generally, it is to be assumed that the motor of the calculating machine rotates, as soon as the apparatus is connected to the source of electric power, and that the motor key on the calculating machine is adapted to couple the shaft of the motor with the other mechanisms of the calculating machine by means of a suitable clutch device. This clutch device has not been specifically shown, as it may be of any conventional type generally used in this type of calculating machines. The motor may also be set going by a special contact device arranged in the coin slots, so that the motor is started, when a coin or a bank note is inserted into the apparatus. The mechanism, above referred to, may be operated directly by bank notes, but in order to obtain greater movements, it is preferred to insert the bank note in a special loose pocket which has a larger thickness than the bank note by itself.

Referring to Fig. 42, the front wall 401 of the apparatus is provided with a slot 284 for inserting a pocket 402 of the type shown in Figs. 49–51. The operator has to insert a bank note into the interior of this pocket. The pocket may be made of Celluloid or any other suitable material. It is of flat shape and closed on all sides, except at one short end wall thereof. In the path of the pocket inserted in the slot 284 are four feeding cylinders 404, 405, 406 and 407. The cylinder 404 is journalled with its spindle 408 at two arms 409, one of which may be seen in Fig. 42. One end of the arm 409 is pivoted, as at 410, to a bracket 411 attached to the front wall 401. The free end of the arm 409 supports a contact member 412 adapted to co-operate with a contact member 413 attached to a bracket 414 fixed to the front wall 401. Between the bracket 414 and the arm 409 is inserted a spring 415 under tension. The arm 409 has a flexible part 416 between the contact member 412 and the spindle 408. This enables the arm 409 to be somewhat bent and at the same time assures intimate contact between the members 412 and 413. The cylinder 405 is journalled with its spindle 417 at two arms 418 and 418a, one, 418, of which may be seen in Fig. 42. One end of the arms 418 is pivoted, as at 419, to a bracket 420 fixed by means of screws 421 to the front wall 401. The arms 418 and 418a are interconnected by a bar 422 (see Figs. 44 and 45). The bar 422 is integral with an arm 423 which supports a contact member 424 adapted to co-operate with a contact member 425 attached to a bracket 426 fixed to the front wall 401. Between this bracket 426 and the arm 423 is inserted a spring 427 under tension. The arm 423 has a resilient part 428 for the same purpose as the resilient part 416 of the arm 409. The other ends of the arms 418 and 418a are provided with pins 429. Each pin supports a finger 430 which is normally pressed against a shoulder 431 at the end of the arm 418 by means of a flat spring 432 attached to the arm 418. The bracket 420 also supports the spindles 433 and 434 of the cylinders 407 and 406, respectively. Each one of these spindles has attached thereto a chain wheel 435 and 436, and an endless chain 437 connects the two chain wheels with each other. The spindle 434 of the cylinder 406 further supports a conical toothed wheel 438 which engages a conical toothed wheel 439 attached to the end of a vertical shaft 440 which is directly or by means of gearings connected with the electric motor (not shown) of the calculating machine. The cylinders 404 and 405 are arranged substantially above the path of movement of the pocket 402 inserted into the slot 284, and the cylinders 406 and 407 are mounted below said path of movement. In continuation of the slot 284 and the space between the upper and lower cylinders is arranged a slot 441 in a container 442 which is supported by a bracket 443 attached thereto by welding or soldering. The bracket 443 is fixed to the front wall 401 by means of screws 444. The interior of the container 442 is in cross-section of the same shape as the pockets 402 shown in Fig. 51. Below the slot 441 the container 442 is provided with two lateral tongues 445 extending somewhat into the interior of the container 442. These tongues 445 and 445a are pivoted to doublearmed levers 446 and 446a which are pivoted between their ends to brackets 447 and 447a attached to the outside walls of the container 442. To the other arm of the levers 446 and 446a are pivoted tongues 448 and 448a which are adapted to extend into lateral openings in the container 442. Each tongue is integral with an upright hook 449 and 449a, respectively. Between the hook and the wall of the container is inserted a spring 450 and 450a, respectively, under tension. Normally the finger 430 associated with the arms 418 and 418a engages the hook 449 and 449a, as indicated in Fig. 47.

A similar arrangement of tongues is arranged at the lower portion 451 of the container 442. In this case, however, the tongues are operated by a mechanism, similar to that shown in Fig. 16, through the intermediary of a device of a similar kind as that shown in Fig. 45. The outer wall of the container 442 supports a bracket 452, to which is pivoted a fork 453, the free ends of which are provided with resiliently mounted fingers 430 (see Fig. 45). The fork has a member 454 extending downwardly and between this member 454 and the wall of the container 442 is inserted a spring 455 under tension. The member 454 is adapted to be engaged by an arm 456 which corresponds to the arm 186 shown in Fig. 16. The other parts pertaining to the arm 456 are in all respects similar to those shown in Fig. 16, so that it is not necessary to again describe such parts in this connection. Below the device at the lower portion 451, the container extends downwardly by a narrow channel 457, through which the pocket 402 when released, will glide downwardly. At the lower end of this channel 457 is pivoted a horizontal member 458 with an opening 459. This opening 459 is slightly larger than the cross-sectional area 460 of the interior of the pocket 402 shown in Fig. 50, so that a bank note contained in the pocket 402 may glide out of the pocket through the opening 459 into a trough 461 attached to the apparatus in appropriate manner. Fig. 42 shows a pocket 402 resting on the horizontal member 458, a bank note 462 being shown as gliding out of the pocket through the opening 459. Between the horizontal member 458 and a bracket 463 attached to the lower end of the channel 457 is inserted a weak spring 464 under tension, tending to keep the member 458 in horizontal position. The channel 457 has at its lower end an opening 465 in communication with a container 466 having a bottom 467. This container 466 is provided with an aperture 468 at the front wall of its lower end and below the trough 461. Through this aperture 468 a pocket may be taken out and filled with a bank note, whereafter it may be inserted into the slot 284.

The contacts 412, 413, 424 and 425 are electrically connected with the other parts of the apparatus in the manner as shown in Fig. 30, it being assumed that the bank note to be inserted shall have a value of fifty crowns.

The mechanisms shown in Fig. 42 and the following work in the following manner:

When a pocket 402 with a bank note is inserted into the slot 284, it will engage the cylinders 406 and 404, whereby the cylinder 404 is pressed upwardly and the contact member 412 engages the contact member 413, thereby closing the following circuit (see Fig. 30): Battery T32, wire T58, coil 469 for the 50-crown key on the calculating machine TA, wire 470, contact member 412, contact member 413, wire T31 and battery. As stated above, the cylinder 406 is connected by the gearing 438 and 439 with the motor of the calculating machine, and therefore the pocket inserted between the cylinders 404 and 406 will be fed forwardly, so that it engages the cylinders 405 and 407. When this takes place, the cylinder 405 is lifted and the contact member 424 engages the contact member 425, thereby closing the following circuit: Battery T32, wire T58, coil T66, wire T161a, contact member 424, contact member 425, wire T31 and battery. The coil T66 will be energized, whereby the motor of the calculating machine is coupled by means of a clutch device with the calculating machine proper, which means that the amount 50 crowns is registered and the key 469 returns to its initial position. At the same time as the cylinder 405 is lifted, also the arms 418 and 418a will be lifted, so that the fingers 430 and 430a will glide past the hooks 449 and 449a (Fig. 47), which is possible on account of the arrangement of the springs 432. When the pocket 402 glides into the container 442, it will rest with its lower surface on the tongues 445 and 445a. It is to be understood, that the cylinders 406 and 407 rotate with such speed, that the pocket 402 receives sufficient inertia to be entirely located in the interior of the container 442. When thereafter the cylinder 405 sinks down again, partly on account of its own weight and partly by the action of the spring 427, the fingers 430 and 430a will engage the sloping surface of the hooks 449 and 449a, so that the hooks are pressed inwardly against the action of their springs 450 and 450a. The tongues 445 and 445a are then drawn outwardly and the tongues 448 and 448a are pressed inwardly. By this means the pocket resting on the tongues 445 and 445a will be released and fall down towards the bottom of the container 442, where it rests, until it is released, when change money amounting to fifty crowns is to be paid out.

When on account of the difference between the money paid in and the amount to be paid or to be registered, also, for instance, a 50-crown bank note is to be paid out as change money, the apparatus works in the following manner. When the coil 166 (see Fig. 16) is energized and the printing stave 174 is moved forward, the arm 453 (Fig. 42) is moved to the left, thereby lifting the fork 453. The fingers on this fork then glide past hooks similar to the hooks 449 and 449a shown in Figs. 47, 48. When the arm 456 returns to its initial position, the spring 455 presses the fork 453 downwardly, thereby pressing said hooks inwardly. Tongues similar to the tongues 445 and 445a shown in Figs. 47 and 48, release the lowermost pocket 402 in the container 442. This pocket glides, with its opening directed downwardly, through the channel 457 and abuts the horizontal member 458, so that the bank note 462, on account of the sudden stoppage of the pocket, falls out of the pocket 402 into the trough 461, from which it may be taken out. Through the inertia of the pocket 402 the horizontal member 458 will be rocked about its pivot, so that the pocket 402 falls over (to the right) into the container 466 towards the bottom 467 thereof.

What we claim is:—

1. The combination with a coin register of the type including a plurality of value indicating keys and means operable upon the actuation of one of said keys to register the value corresponding to the said actuated key, of coin-receiving means including a plurality of coin chutes for receiving coins of different values, electric contact means associated with said coin chutes and operated by the inserted coins, electric circuits controlled by said contact means, electromagnets inserted in said circuits and associated with said value indicating keys, one of said coin chutes adapted for special coins of a value consisting of more than one digit differing from zero, the electric circuit associated with said chute for special coins including relay means for cutting in the electric circuits pertaining to the keys which correspond to the digits of said special coins.

2. The combination with a coin register of the type including a plurality of value indicating keys and printing means, of coin controlled electric circuits including electromagnets to actuate said keys, coin containers associated with said coin register, means for actuating said printing means, and coin discharge means automatically actuated by said printing means.

3. The combination with a cash register of the type including a plurality of value indicating keys and printing means, of a plurality of chutes in which pieces of currency of different values may be deposited, means for actuating the value indicating keys corresponding to the values of the deposited currency, said keys-actuating means including electric circuits and means operable upon the passage of a piece of currency through each chute to energize the electric circuit corresponding to that currency chute, currency containers for selectively storing currency deposited in certain of said chutes, means for discharging currency from said containers, means for manually setting a currency value on said value indicating keys, means for energizing said printing means to record the total value indicated by those value indicating keys which were actuated by the deposited currency, and means controlled by said printing means for actuating said currency-discharging means to discharge from said containers currency equal to the difference between the said total value and the value manually set on said value indicating keys.

4. The combination as claimed in claim 3, wherein said means for energizing said printing means is actuated by said manual setting means.

5. The combination as claimed in claim 3, wherein said means for energizing said printing means comprises a manually operated member, and electrically operated means energized by an operation of said member for actuating said printing means.

6. The combination with a coin register of the type including a plurality of value indicating keys, means for adding indicated values, means for subtracting indicated values from said added values, printing means, means for setting said printing means in correspondence to the difference between said added and subtracted values, of coin controlled electric circuits including electromagnets to actuate said keys, coin containers associated with said coin register, means to discharge coins from said containers in correspondence to said difference between said added and subtracted values, means to couple said printing means with said coin discharge means and manually operated electric circuits including electromagnets to actuate said coupling means.

7. The combination with a coin register of the type including a plurality of value indicating keys, of coin controlled electric circuits including electromagnets to actuate said keys, a plurality of manually operated contact means, electrically operated printing means adapted to be energized upon the actuation of a key by a coin and the subsequent manual actuation of any one contact means, locking means operable by any of said contact means and adapted upon the actuation of one of said contact means to lock the remainder of said plurality of contact means.

8. The combination with a coin register of the type including a plurality of value indicating keys and printing means including printing staves, of a plurality of coin chutes adapted to receive coins of different values, coin controlled circuits including electromagnets to actuate said keys, said circuits having contacts positioned to be closed by the passage of a coin through a chute, a plurality of coin containers, and means to discharge coins from said containers; said discharge means including a lever system, a rockable toothed wheel, an electromagnet to rock said wheel, and teeth on said printing staves, said teeth adapted to engage the teeth on said toothed wheel.

9. The combination with a coin register of the type including a plurality of value indicating keys, of a plurality of chutes for receiving coins, means for recording the value of deposited coins, coin controlled electric circuits including contacts closed by the passage of coins through the respective chutes and electromagnets to actuate said keys, a plurality of coin containers, means actuated by said recording means to discharge coins from said containers, a coin chute common for all coin containers, and a trough into which said coin chute opens.

10. The combination with a coin register of the electric motor driven type including a plurality of value indicating keys, means for adding indicated values, means for subtracting indicated values, totalizing means, sub-totalizing means, printing means, means for setting said printing means in operative or non-operative position, paper strip feeding means, paper strip cutting means, means to operate said keys manually and coupling means to couple the electric motor with the mechanisms of the coin register of coin containers, coin discharge means, coin controlled electric circuits including electromagnets to actuate said keys, electric circuits including electromagnets to actuate said adding, subtracting, sub-totalizing, printing means setting, paper strip feeding, paper strip cutting, coin discharge means and motor coupling means, a manually operated contact means to control the electric circuits for the sub-totalizing, motor coupling, printing means setting and subtracting means, a manually operated bar adapted to be also actuated by said manually operated keys, contact means attached to said bar and controlling an electric circuit including an electromagnet, contact means actuated by said last-named electromagnet and adapted to successively cooperate with contact means pertaining to said circuits including said motor coupling, subtracting, totalizing, coin discharge means, motor coupling, printing means setting, paper strip feeding and paper strip cutting means.

11. In the combination with a coin register of the type including a plurality of value indicating keys, of a plurality of chutes for receiving coins, coin controlled electric circuits including contacts closed by the passage of coins through the respective chutes and electromagnets to actuate said keys, and means for restoring an actuated key to normal position in the event that the deposited coin was of light weight, said restoring means including an electric contact mechanism operated in one direction by spring means and in the other direction by an electromagnet.

12. In the combination with a coin register of the type including a plurality of value indicating keys, of a plurality of chutes for receiving coins, coin controlled electric circuits including contacts closed by the passage of coins through the respective chutes and electromagnets to actuate said keys, and means for restoring an actuated key to normal position in the event that the deposited coin was of light weight, said restoring means including an electric contact mechanism operated in one direction by spring means and in the other direction by an electromagnet and a speed regulating governor associated with said contact mechanism.

13. The combination with a coin register of the type including a plurality of value indicating keys, calculating mechanisms, ticket delivering means and printing means, of coin containers, electrically operated coin discharge means, coin-receiving means and coin controlled electric circuits including electromagnets to actuate said keys, a movable contact member, a special electric circuit including an electromagnet to actuate said movable contact member, a plurality of fixed contact members, electric circuits closed by engagement of said movable contact member with said fixed contact members and including electromagnets to actuate said calculating mechanisms, ticket delivering means, printing means and coin discharge means, a manually operated contact means to control the special electric circuit including said electromagnet.

14. The combination with a coin register of the type including a plurality of value indicating keys, of coin-receiving means and coin controlled electric circuits including electromagnets to actuate said keys, a plurality of magazines containing goods to be sold, a chute for each magazine, locking means for each chute, electromagnets to release said locking means, a plurality of manually operated key means provided with a contact member, a plurality of sets of fixed contact members adapted to be engaged by the contact of an associated manually operated key, each set to cooperate with the contact member on said key means, electric circuits associated with said fixed contact members and including said electromagnets to actuate the value indicating keys corresponding to the value of the goods to be sold and also including said locking means releasing electromagnets.

15. The combination with a coin register of the type including a plurality of value indicating keys and value indicating correction means, of a plurality of coin receiving chutes, electrically operated means automatically actuated by the passage of a coin through a coin chute for actuating that value indicating key corresponding to the value of the coin passing through the coin chute, a branching-off coin chute for each of said coin receiving chutes, a coin weighing means at the entrance of each of said branching-off chutes, said weighing means including relay means to actuate said correction means, when the weight of the coin is too light.

16. The combination as claimed in claim 15, in which the said weighing means consists of a balanced double armed lever system, one arm of which extends into the coin chute and the other arm supports contact means, said lever system rotatable in a substantially horizontal plane and actuated by spring means, said contact means associated with an electric circuit including an electromagnet with a damping winding, a pivoted lever means in mechanical contact with said rotatable lever system and supporting a contact member, said electromagnet adapted to actuate said pivoted lever means, said contact member associated with an electric circuit including an electromagnet forming a part of said relay means to actuate said correction means.

17. The combination with a machine for addition and subtraction, said machine including calculating means, and value indicating keys for setting up the amounts to be entered upon said calculating means, of a plurality of coin chutes for receiving coins of different values, means including electrical circuits energized by a coin in passing through its respective chute for actuating the corresponding value indicating key, means for totalizing on said calculating machine the value of the deposited coins, means operable thereafter for subtracting the amount of a predetermined service charge from the total standing on said calculating means, a plurality of containers for coins of different values, and change-making means operable by said calculating means when a positive remainder results from said subtraction for discharging coins from said containers in an amount equal to said positive value.

18. The combination with a coin register of the type including a plurality of value indicating keys, of coin receiving means, electric circuits controlled by coins in passage to said receiving means for actuating said keys, a plurality of goods delivering means, spring means tending to actuate said delivery means to discharge the contained goods therefrom, electrically releasable locking means for normally preventing operation of said spring means, manually operable means for actuating said coin register to totalize the amount corresponding to the keys actuated by coins passing to said receiving means, and means operable by said cash register when the totalized value registered thereon is at least equal to the price of the goods for rendering said locking means inoperative, whereby the associated spring means operates to deliver goods from said goods delivering means.

19. The combination with a coin register of the type including a plurality of value indicating keys, coin receiving means, coin controlled electric circuits including electric magnets to actuate said keys automatically by coins deposited in said receiving means, and coin containers for storing coins deposited in certain of said receiving means, of goods delivery means, manually controlled means operable successively to actuate said coin register to totalize the amount represented by actuated keys and to subtract from said totalized amount the price of the goods, means controlled by said cash register and operable when said totalized amount is at least equal to the value of the goods to deliver goods from said goods delivery means, and means controlled by said cash register and operable when said totalized amount exceeds the price of the goods to deliver coins from said coin receivers to a value equal to the difference between the totalized amount and the price of the goods.

UNO SUNDELIN.
KARL AXEL TEODOR GRANZELIUS.